(12) United States Patent
Park

(10) Patent No.: US 10,748,317 B2
(45) Date of Patent: Aug. 18, 2020

(54) LOGO CONTROLLER AND LOGO CONTROL METHOD

(71) Applicant: Samsung Display Co., Ltd., Yongin-si, Gyeonggi-do (KR)

(72) Inventor: Geun Jeong Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/523,843

(22) Filed: Jul. 26, 2019

(65) Prior Publication Data
US 2020/0074708 A1    Mar. 5, 2020

(30) Foreign Application Priority Data

Sep. 4, 2018 (KR) .......................... 10-2018-0105502

(51) Int. Cl.
| | |
|---|---|
| *G06T 11/60* | (2006.01) |
| *G06T 7/90* | (2017.01) |
| *G06K 9/20* | (2006.01) |
| *G06K 9/46* | (2006.01) |
| *G09G 3/3208* | (2016.01) |

(52) U.S. Cl.
CPC ............ *G06T 11/60* (2013.01); *G06K 9/2054* (2013.01); *G06K 9/4604* (2013.01); *G06T 7/90* (2017.01); *G09G 3/3208* (2013.01); *G09G 2310/027* (2013.01); *G09G 2320/043* (2013.01)

(58) Field of Classification Search
None
See application file for complete search history.

(56) References Cited

U.S. PATENT DOCUMENTS

| | | | | |
|---|---|---|---|---|
| 5,583,949 | A * | 12/1996 | Smith | .................... G06K 9/481 |
| | | | | 382/199 |
| 9,691,353 | B2 | 6/2017 | Joo et al. | |
| 2009/0067006 | A1* | 3/2009 | Kobayashi | ......... H04N 1/00864 |
| | | | | 358/3.06 |

(Continued)

FOREIGN PATENT DOCUMENTS

| | | |
|---|---|---|
| KR | 10-2015-0049895 A | 5/2015 |
| KR | 10-2016-0019341 A | 2/2016 |

(Continued)

OTHER PUBLICATIONS

EPO Extended Search Report dated Jan. 31, 2020, for corresponding European Patent Application No. 19195248.0 (16 pages).

*Primary Examiner* — Frank S Chen
(74) *Attorney, Agent, or Firm* — Lewis Roca Rothgerber Christie LLP

(57) ABSTRACT

A logo controller includes: a logo area detector for detecting a logo area commonly included in a plurality of first image frames, based on the plurality of first image frames; a logo peripheral area setting unit for setting a logo peripheral area expanded based on the logo area; a display load determiner for calculating a display load value, based on grayscale values of at least one first image frame, and determining the difference between a logo peripheral area representative value based on grayscale values of the logo peripheral area and the display load value exceeds a first reference value; and a logo peripheral area corrector for generating a second image frame.

20 Claims, 16 Drawing Sheets

(56) References Cited

U.S. PATENT DOCUMENTS

| | | | | |
|---|---|---|---|---|
| 2013/0236091 A1* | 9/2013 | Ubillos | ............... | G06F 3/0482 |
| | | | | 382/163 |
| 2014/0146071 A1 | 5/2014 | Kim et al. | | |
| 2015/0062197 A1 | 3/2015 | Jung et al. | | |
| 2016/0217731 A1 | 7/2016 | Joo et al. | | |
| 2017/0116915 A1* | 4/2017 | Song | ..................... | G09G 3/20 |
| 2019/0327386 A1* | 10/2019 | Ulichney | ............... | H04N 1/52 |

FOREIGN PATENT DOCUMENTS

| KR | 10-2016-0071886 A | 6/2016 |
|---|---|---|
| KR | 10-2016-0095673 A | 8/2016 |

* cited by examiner

LOGO CONTROLLER AND LOGO CONTROL METHOD

CROSS-REFERENCE TO RELATED APPLICATION

The present application claims priority to and the benefit of Korean patent application No. 10-2018-0105502 filed on Sep. 4, 2018 in the Korean Intellectual Property Office, the entire disclosure of which is incorporated herein by reference.

BACKGROUND

1. Field

The present disclosure generally relates to a logo controller and a logo control method.

2. Description of the Related Art

With the growth of information technologies, the importance of display devices, which operate as a connection medium between a user and digital information, has grown. Accordingly, display devices such as liquid crystal display devices, organic light emitting display devices, and plasma display devices are increasingly used.

An organic light emitting display device includes a plurality of pixels, and displays an image frame by allowing organic light emitting diodes of the plurality of pixels to emit lights so as to correspond to a plurality of grayscale values constituting the image frame.

When image frames include a logo in a specific common area, organic light emitting diodes in the specific common area may continuously emit light with high luminance so as to display the logo. Therefore, the organic light emitting diodes in the specific common area may be more rapidly degraded as compared with organic light emitting diodes in another area.

The Background section of the present Specification includes information that is intended to provide context to example embodiments, and the information in the present Background section does not necessarily constitute prior art.

SUMMARY

Aspects of some example embodiments provide a logo controller capable of adjusting grayscale values of a logo area and a logo peripheral area depending on a display load.

According to some example embodiments of the present disclosure, a logo controller includes: a logo area detector configured to detect a logo area commonly included in a plurality of first image frames, based on the plurality of first image frames; a logo peripheral area setting unit configured to set a logo peripheral area expanded from the logo area; a display load determiner configured to calculate a display load value, based on grayscale values of at least one first image frame, and determine the difference between a logo peripheral area representative value based on grayscale values of the logo peripheral area and the display load value exceeds a first reference value; and a logo peripheral area corrector configured to generate a second image frame by decreasing at least some of the grayscale values of the logo peripheral area, when the difference between the logo peripheral area representative value and the display load value exceeds the first reference value, and the difference between a logo area representative value based on grayscale values of the logo area and a first logo area threshold value based on the grayscale values of the logo peripheral area is equal to or smaller than a second reference value.

The logo controller may further include a first logo area threshold value setting unit configured to set the first logo area threshold value, based on the grayscale values of the logo peripheral area.

The first logo area threshold value setting unit may include: a first average value calculator configured to calculate a first average value of the grayscale values of the logo peripheral area of the first image frame; and a margin value adder configured to calculate the first logo area threshold value by adding a margin value to the first average value. The logo peripheral area representative value may correspond to the first average value.

The display load determiner may include: a second average value calculator configured to calculate a second average value of the grayscale values of the at least one first image frame; and a first comparator configured to determine whether the difference between the first average value and the second average value exceeds the first reference value. The display load value may correspond to the second average value.

The logo peripheral area corrector may include a third average value calculator configured to calculate a third average value of the grayscale values of the logo area of the first image frame. The logo area representative value may correspond to the third average value.

The logo peripheral area corrector may further include: a second comparator configured to compare whether the difference between the third average value and the first logo area threshold value is equal to or smaller than the second reference value; a logo peripheral area curve calculator configured to calculate first mapping curves that limit grayscale values of sub-areas of the logo peripheral area respectively to sub-area threshold values or less, when the difference between the third average value and the first logo area threshold value is equal to or smaller than the second reference value; and a second image frame generator configured to generate the second image frame by decreasing at least some of the grayscale values of the sub-areas of the first image frame, based on the first mapping curves.

The sub-areas threshold values may decrease as the corresponding sub-areas are closer to the logo area.

The sub-area threshold values may be larger than or equal to the first logo area threshold value.

The logo controller may further include a second logo area threshold value setting unit configured to set a second logo area threshold value, based on grayscale values of the logo peripheral area of the second image frame.

The logo controller may further include a logo area corrector configured to correct grayscale values of the logo area of the second image frame to the second logo area threshold value or less.

The logo area corrector may include: a logo area curve calculator configured to calculate a second mapping curve that limits the grayscale values of the logo area of the second image frame to the second logo area threshold value or less; and a third image frame generator configured to generate a third image frame by decreasing at least some of the grayscale values of the logo area of the second image frame, based on the second mapping curve.

The logo area detector may include: a high grayscale area detector configured to detect a high grayscale area commonly included in the plurality of first image frames; a stop area detector configured to detect a stop area commonly included in the plurality of first image frames; an edge area detector configured to detect an edge area commonly included in the plurality of first image frames; and an overlapping area extractor configured to detect, as the logo area, an overlapping area of the high grayscale area, the stop area, and the edge area.

According to some example embodiments of the present disclosure, a logo controller includes: a logo detector configured to detect a logo commonly included in a plurality of first image frames, based on the plurality of first image frames; a logo peripheral area setting unit configured to set a logo peripheral area expanded from the logo; a display load determiner configured to calculate a display load value, based on grayscale values of at least one first image frame, and determine the difference between a logo peripheral area representative value based on grayscale values of the logo peripheral area and the display load value exceeds a first reference value; and a logo peripheral area corrector configured to generate a second image frame by decreasing at least some of the grayscale values of the logo peripheral area, when the difference between the logo peripheral area representative value and the display load value exceeds the first reference value, and the difference between a logo representative value based on grayscale values of the logo and a first logo threshold value based on the grayscale values of the logo peripheral area is equal to or smaller than a second reference value.

The logo peripheral area setting unit may include: a logo area setting unit configured to set a logo area that surrounds the outer edge of the logo with a plurality of straight lines; and an area expander configured to set the outer edge of the logo peripheral area by expanding the outer edge of the logo area according to a predetermined spacing distance value. The inner edge of the logo peripheral area may correspond to the outer edge of the logo.

The logo peripheral area corrector may include a logo peripheral area curve calculator configured to calculate first mapping curves that limit grayscale values of sub-areas of the log peripheral area respectively to sub-area threshold values or less, when the difference between the logo representative value and the first logo threshold value is equal to or smaller than the second reference value. The first logo threshold value may be larger than a minimum value of the sub-area threshold values and be smaller than a maximum value of the sub-area threshold values.

According to some example embodiments of the present disclosure, a logo control method includes: a logo area detection step of detecting a logo area commonly included in a plurality of first image frames, based on the plurality of first image frames; a logo peripheral area setting step of setting a logo peripheral area expanded from the logo area; a display load determination step of calculating a display load value, based on grayscale values of at least one first image frame, and determining the difference between a logo peripheral area representative value based on grayscale values of the logo peripheral area and the display load value exceeds a first reference value; and a logo peripheral area correction step of generating a second image frame by decreasing at least some of the grayscale values of the logo peripheral area, when the difference between the logo peripheral area representative value and the display load value exceeds the first reference value, and the difference between a logo area representative value based on grayscale values of the logo area and a first logo area threshold value based on the grayscale values of the logo peripheral area is equal to or smaller than a second reference value.

The display load value may correspond to an average value of the grayscale values of the at least one first image frame, the logo peripheral area representative value may correspond to an average value of the grayscale values of the logo peripheral area of the first image frame, the logo area representative value may correspond to an average value of the grayscale values of the logo area of the first image frame, and the first logo area threshold value may correspond to a value obtained by adding a margin value to the average value of the grayscale values of the logo peripheral area of the first image frame.

The logo peripheral area correction step may include: when the difference between the logo area representative value and the first logo area threshold value is equal to or smaller than the second reference value, calculating first mapping curves that limit grayscale values of sub-areas of the logo peripheral area respectively to sub-area threshold values; and generating the second image frame by decreasing at least some of the grayscale values of the sub-areas of the first image frame, based on the first mapping curves.

The logo control method may further include setting a second logo area threshold value, based on grayscale values of the logo peripheral area of the second image frame. The second logo area threshold value may be smaller than or equal to the first logo area threshold value.

The logo control method may further include: calculating a second mapping curve that limits grayscale values of the logo area of the second image frame to the second logo area threshold value or less; and generating a third image frame by decreasing at least some of the grayscale values of the logo area of the second image frame, based on the second mapping curve.

BRIEF DESCRIPTION OF THE DRAWINGS

Aspects of some example embodiments will now be described more fully hereinafter with reference to the accompanying drawings; however, they may be embodied in different forms and should not be construed as limited to the embodiments set forth herein. Rather, these embodiments are provided so that this disclosure will be more thorough and more complete, and will more fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
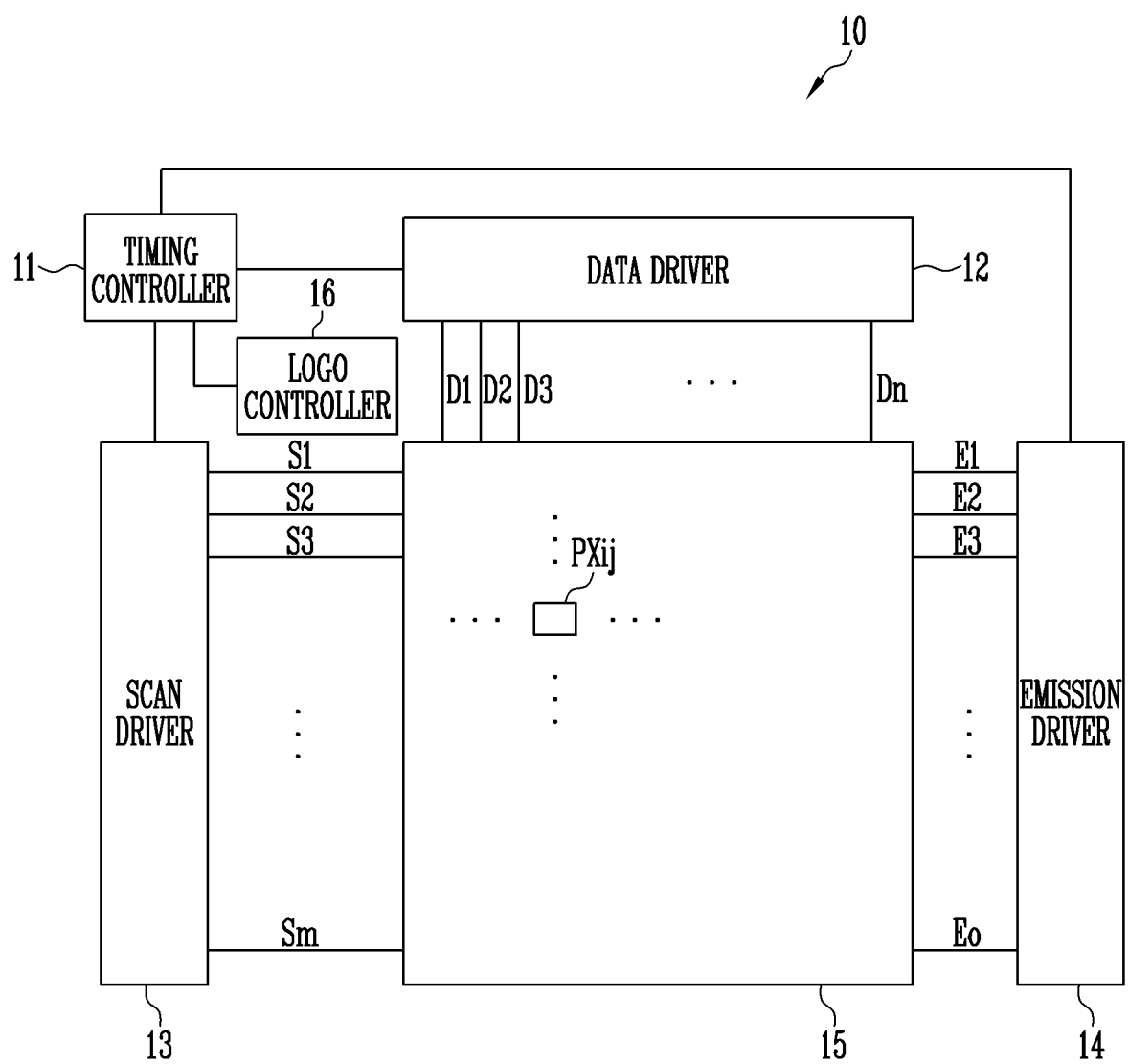
FIG. 1 is a diagram illustrating a display device according to some example embodiments of the present disclosure.

Hereinafter, aspects of some example embodiments are described in more detail with reference to the accompanying drawings so that those skilled in the art may easily practice the present disclosure. The present disclosure may be implemented in various different forms and is not limited to the example embodiments described in the present specification.

Certain aspects or components that are irrelevant or unnecessary for a person having ordinary skill in the art to understand the description will be omitted for brevity and to more clearly describe certain aspects of the present disclosure, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present disclosure is not limited thereto. Thicknesses of several portions and regions are exaggerated for more clear expressions.

FIG. 1 is a diagram illustrating a display device according to some example embodiments of the present disclosure.

Referring to FIG. 1, the display device 10 according to some example embodiments of the present disclosure may include a timing controller 11, a data driver 12, a scan driver 13, an emission driver 14, a pixel unit 15, and a logo controller 16.

The timing controller 11 may provide grayscale values and control signals to the data driver 12 to be suitable for specifications of the data driver 12. Also, the timing controller 11 may provide a clock signal, a scan start signal, etc. to the scan driver 13 to be suitable for specifications of the scan driver 13. Also, the timing controller 11 may provide a clock signal, an emission stop signal, etc. to the emission driver 14 to be suitable for specifications of the emission driver 14.

The data driver 12 may generate data voltages to be provided to data lines D1, D2, D3, . . . , and Dn, using the grayscale values and control signals, which are received from the timing controller 11. For example, the data driver 12 may sample grayscale values, using a clock signal, and apply data voltages corresponding to the grayscale values to the data lines D1 to Dn in units of pixel rows. Here, n may be a natural number.

The scan driver 13 may generate scan signals to be provided to scan lines S1, S2, S3, . . . , and Sm by receiving the clock signal, the scan start signal, etc. from the timing controller 11. For example, the scan driver 13 may sequentially provide the scan signals having a turn-on level pulse to the scan line S1 to Sm. For example, the scan driver 13 may be configured in the form of a shift register, and generate the scan signals in a manner that sequentially transfers the scan start signal provided in the form of a turn-on level pulse to a next stage circuit under the control of the clock signal.

The emission driver 14 may generate emission signals to be provided to emission lines E1, E2, E3, . . . , and Eo by receiving the clock signal, the emission stop signal, etc. from the timing controller 11. For example, the emission driver 14 may sequentially provide the emission signals having a turn-off level pulse to the emission lines E1 to Eo. For example, the emission driver 14 may be configured in the form of a shift register, and generate the emission signals in a manner that sequentially transfers the emission stop signal provided in the form of a turn-off level pulse to a next stage circuit under the control of the clock signal. Here, o may be a natural number.

The pixel unit 15 includes a plurality of pixels. Each pixel PXij may be connected to a corresponding data line, a corresponding scan line, and a corresponding emission line. Here, i and j may be natural numbers, where i corresponds to a row of the pixels and j corresponds to a column of the pixels. The pixel PXij may mean a pixel in which a scan transistor is connected to an ith scan line and is connected to a jth data line.

The logo controller 16 may detect a logo or logo area from an image frame received from the timing controller 11, and correct grayscale values corresponding to the logo or logo area. In some embodiments, the logo controller 16 may correct grayscale values corresponding to a logo peripheral area. Definitions of the logo, the logo area, and the logo peripheral area will be described in more detail later with reference to drawings from FIG. 7.

In some embodiments, a portion or the whole of the logo controller 16 may be integrally configured with the timing controller 11. For example, a portion or the whole of the logo controller 16 along with the timing controller 11 may be configured in the form of an integrated circuit. In some embodiments, a portion or the whole of the logo controller 16 may be implemented in a software manner in the timing controller 11.

Figure 2:
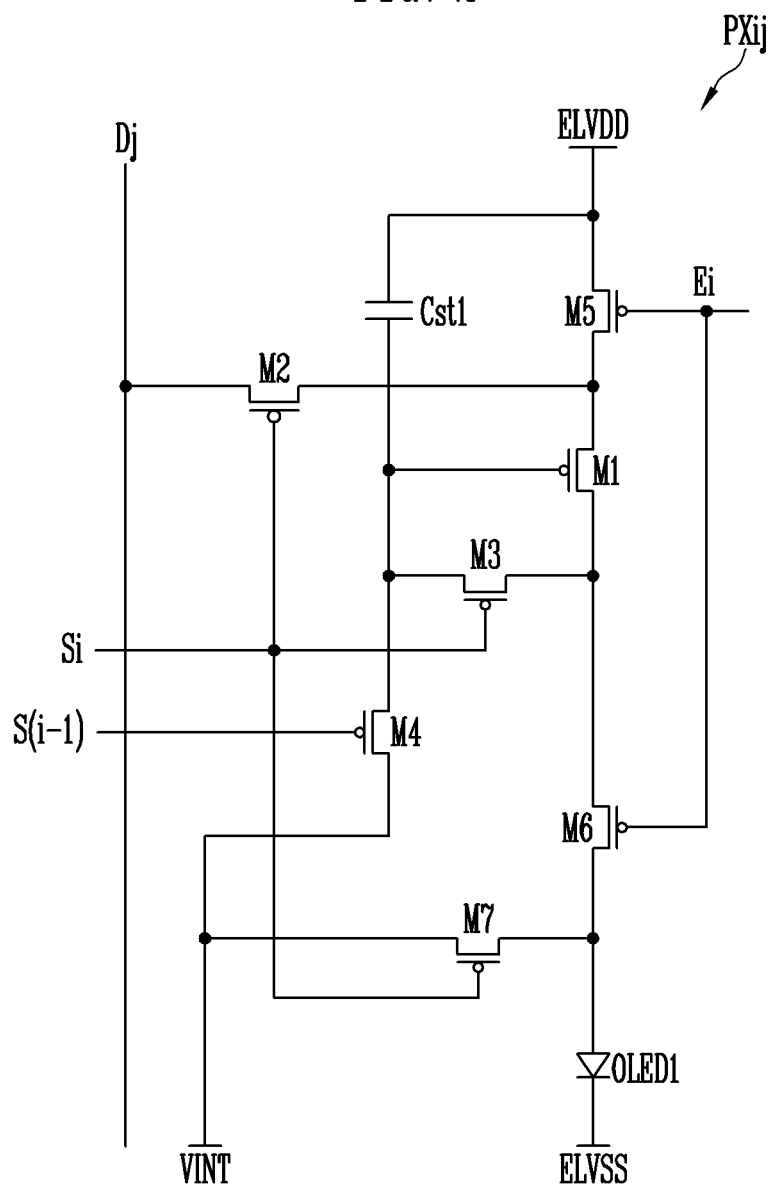
FIG. 2 is a diagram illustrating a pixel according to some example embodiments of the present disclosure.

FIG. 2 is a diagram illustrating a pixel according to some example embodiments of the present disclosure.

Referring to the pixel PXij may include transistors M1, M2, M3, M4, M5, M6, and M7, a storage capacitor Cst1, and an organic light emitting diode OLED1.

In some example embodiments, the transistors are implemented with a P-type transistor, but those skilled in the art may implement a pixel circuit having the same function, using an N-type transistor.

One electrode of the storage capacitor Cst1 is connected to a first power voltage line ELVDD, and the other electrode of the storage capacitor Cst1 is connected to a gate electrode of the transistor M1.

One electrode of the transistor M1 is connected to the other electrode of the transistor M5, the other electrode of the transistor M1 is connected to one electrode of the transistor M6, and the gate electrode of the transistor M1 is connected to the other electrode of the storage capacitor Cst1. The transistor M1 may be referred to as a driving transistor. The transistor M1 determines an amount of driving current flowing between the first power voltage line ELVDD and a second power voltage line ELVSS according to a potential difference between the gate electrode and a source electrode.

One electrode of the transistor M2 is connected to a data line Dj, the other electrode of the transistor M2 is connected to the one electrode of the transistor M1, and a gate electrode of the transistor M2 is connected to a current scan line Si. The transistor M2 may be referred to as a switching transistor, a scan transistor or the like. The transistor M2 allows a data voltage of the data line Dj to be input to the pixel PXij when a turn-on level scan signal is applied to the current scan line Si.

One electrode of the transistor M3 is connected to the other electrode of the transistor M1, the other electrode of the transistor M3 is connected to the gate electrode of the transistor M1, and a gate electrode of the transistor M3 is connected to the current scan line Si. The transistor M3 allows the transistor M1 to be diode-connected when a turn-on level scan signal is applied to the current scan line Si.

One electrode of the transistor M4 is connected to the gate electrode of the transistor M1, the other electrode of the transistor M4 is connected to an initialization voltage line VINT, and a gate electrode of the transistor M4 is connected to a previous scan line S(i−1). In some example embodiments, the gate electrode of the transistor M4 may be connected to another scan line. The transistor M4 transfers an initialization voltage to the gate electrode of the transistor M1 when a turn-on level scan signal is applied to the previous scan line S(i−1), to initialize a charge quantity of the gate electrode of the transistor M1.

One electrode of the transistor M5 is connected to the first power voltage line ELVDD, the other electrode of the transistor M5 is connected to the one electrode of the transistor M1, and a gate electrode of the transistor M5 is connected to an emission line Ei. The one electrode of the transistor M6 is connected to the other electrode of the transistor M1, the other electrode of the transistor M6 is connected to an anode electrode of the organic light emitting diode OLED1, and a gate electrode of the transistor M6 is connected to the emission line Ei. Each of the transistors M5 and M6 may be referred to as an emission transistor. Each of the transistors M5 and M6 allows the organic light emitting diode OLED1 to emit light by forming a driving current path between the first power voltage line ELVDD and the second power voltage line ELVSS when a turn-on level emission signal is applied to the emission line Ei.

One electrode of the transistor M7 is connected to the anode electrode of the organic light emitting diode OLED1, the other electrode of the seventh transistor M7 is connected to the initialization voltage line VINT, and a gate electrode of the transistor M7 is connected to the current scan line Si.

In some example embodiments, the gate electrode of the transistor M7 may be connected to another scan line. For example, the gate electrode of the transistor M7 may be connected to the previous scan line S(i−1), a previous scan line before the previous scan line S(i−1) (e.g., S(i−2)), a next scan line (e.g., S(i+1)th scan line), or a next scan line after the (i+1)th scan line (e.g., S(i+2). The transistor M7 transfers the initialization voltage to the anode electrode of the organic light emitting diode OLED1 when a turn-on level scan signal is applied to the current scan line Si, to initialization a charge quantity accumulated in the organic light emitting diode OLED1.

The anode electrode of the organic light emitting diode OLED1 is connected to the other electrode of the transistor M6, and a cathode electrode of the organic light emitting diode OLED1 is connected to the second power voltage line ELVSS.

Figure 3:
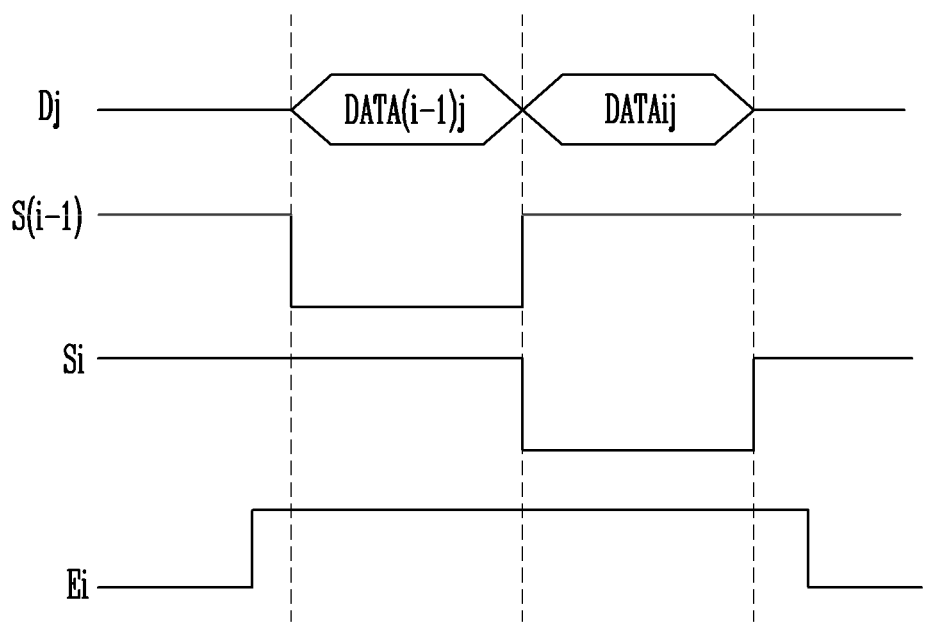
FIG. 3 is a diagram illustrating a driving method of the pixel according to some example embodiments of the present disclosure.

FIG. 3 is a diagram illustrating a driving method of the pixel according to some example embodiments of the present disclosure.

First, a data voltage DATA(i−1)j of a previous pixel row is applied to the data line Dj, and a turn-on level (low level) scan signal is applied to the previous scan line S(i−1).

Because a turn-off level (high level) scan signal is applied to the current scan line Si, the transistor M2 is in a turn-off state, and the data voltage DATA(i−1)j of the previous pixel row is prevented from being input to the pixel PXij.

Because the transistor M4 is in a turn-on state, the initialization voltage is applied to the gate electrode of the transistor M1 such that the charge quantity of the gate electrode of the transistor M1 is initialized. Because a turn-off level emission signal is applied to the emission line Ei, the transistors M5 and M6 are in the turn-off state, and unnecessary emission of the organic light emitting diode OLED1 in the process of applying the initialization voltage is prevented or reduced.

Next, a data voltage DATAij of a current pixel row is applied to the data line Dj, and a turn-on level scan signal is applied to the current scan line Si. Accordingly, the transistors M2, M1, and M3 are in a conduction state, and the data line Dj and the gate electrode of the transistor M1 are electrically connected. Thus, the data voltage DATAij is applied to the other electrode of the storage capacitor Cst1, and the storage capacitor Cst1 accumulates a charge quantity corresponding to the difference between the voltage of the first power voltage line ELVDD and the data voltage DATAij.

Because the transistor M7 is in the turn-on state, the anode electrode of the organic light emitting diode OLED1 and the initialization voltage line VINT are electrically connected, and the organic light emitting diode OLED1 is precharged or initialized to a charge quantity corresponding to the difference between the initialization voltage and the voltage of the second power voltage line ELVSS.

Subsequently, when a turn-on level emission signal is applied to the emission line Ei, the transistors M5 and M6 are in the conduction state, and the amount of driving current flowing through the transistor M1 is adjusted depending on a charge quantity accumulated in the storage capacitor Cst1, so that the driving current flows through the organic light emitting diode OLED1. The organic light emitting diode OLED1 emits light until before a turn-off level emission signal is applied to the emission line Ei.

Figure 4:
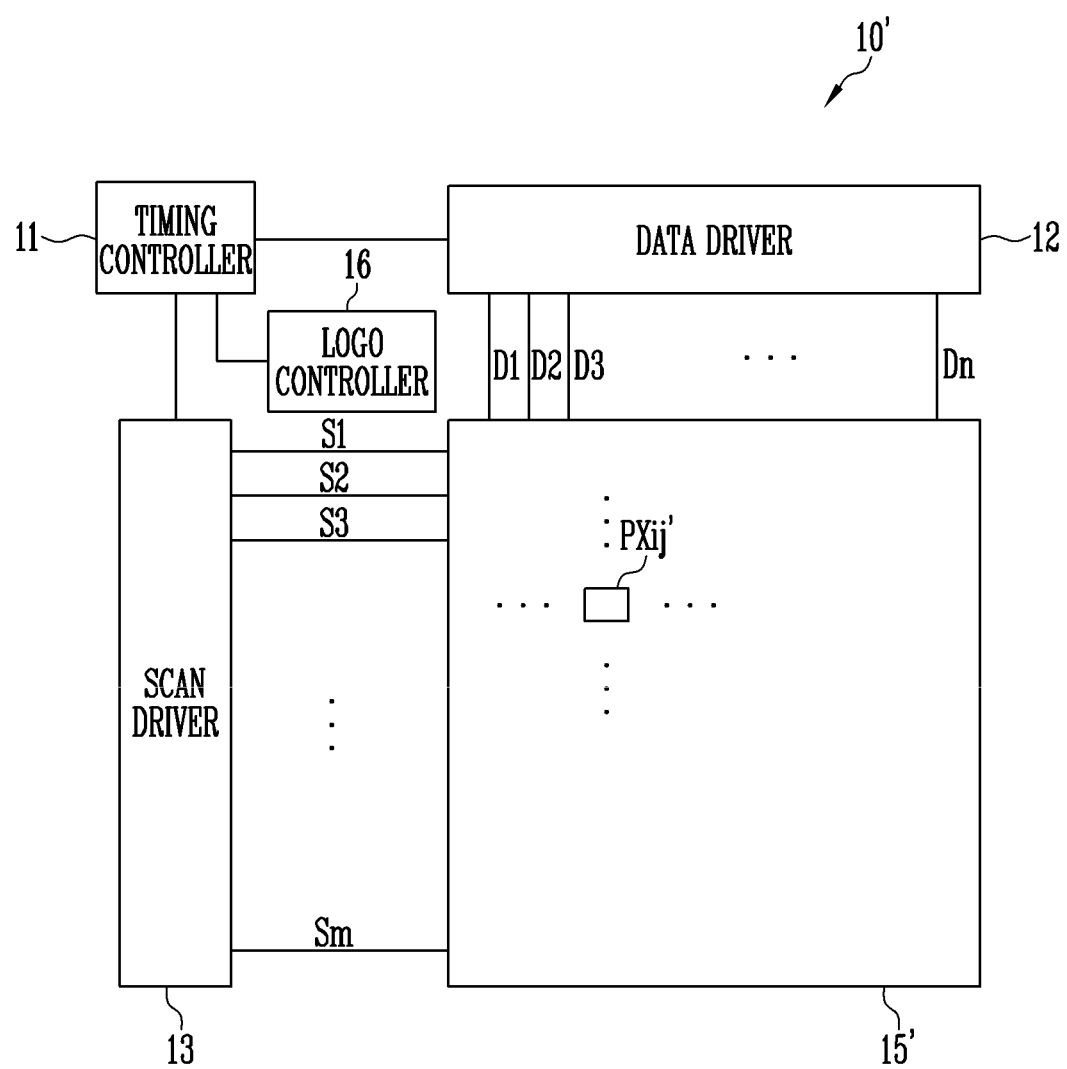
FIG. 4 is a diagram illustrating a display device according to some example embodiments of the present disclosure.

FIG. 4 is a diagram illustrating a display device according to some example embodiments of the present disclosure.

Referring to FIG. 4, the display device 10' according to some example embodiments of the present disclosure may include a timing controller 11, a data driver 12, a scan driver 13, a pixel unit 15', and a logo controller 16.

The display device 10' of FIG. 4 includes components substantially identical to those of the display device 10 of FIG. 1, except the emission driver does not exist, and therefore, some repetitive or overlapping descriptions may be omitted for brevity.

Figure 5:
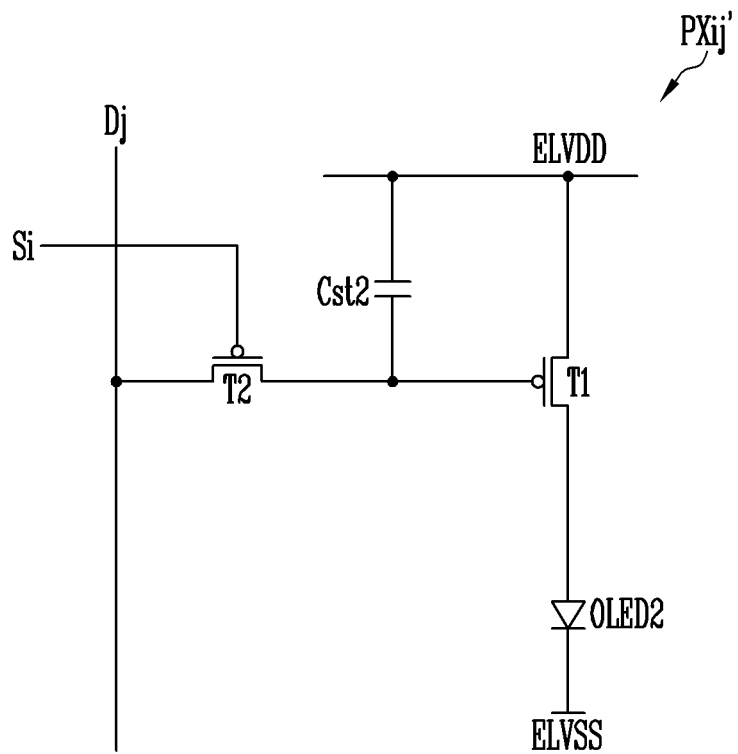
FIG. 5 is a diagram illustrating a pixel according to some example embodiments of the present disclosure.
Figure 6:
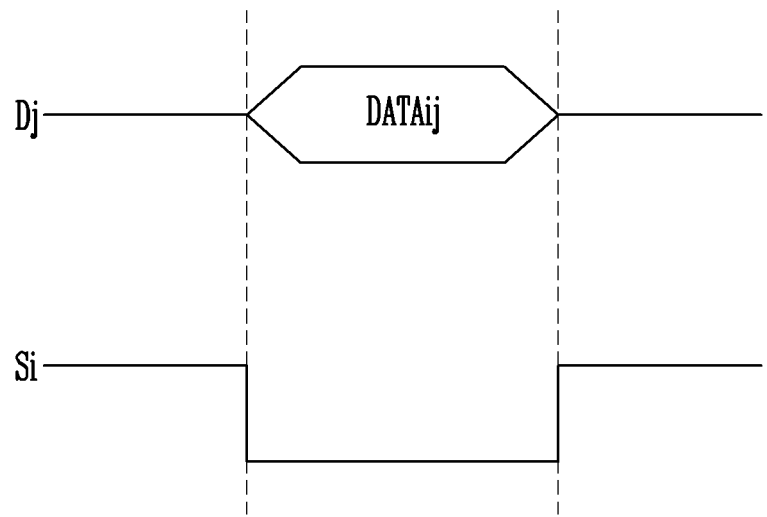
FIG. 6 is a diagram illustrating a driving method of the pixel according to some example embodiments of the present disclosure.

FIG. 5 is a diagram illustrating a pixel according to some example embodiments of the present disclosure. FIG. 6 is a diagram illustrating a driving method of the pixel according to some example embodiments of the present disclosure.

The pixel PXij' may include a plurality of transistors T1 and T2, a storage capacitor Cst2, and an organic light emitting diode OLED2.

A gate electrode of the transistor T2 is connected to a scan line Si, one electrode of the transistor T2 is connected to a data line Dj, and the other electrode of the transistor T2 is connected to a gate electrode of the transistor M1. The transistor T2 may be referred to as a switching transistor, a scan transistor or the like.

The gate electrode of the transistor M1 is connected to the other electrode of the transistor T2, one electrode of the transistor M1 is connected to a first power voltage line ELVDD, and the other electrode of the transistor M1 is connected to an anode electrode of the organic light emitting diode OLED2. The transistor T1 may be referred to as a driving transistor.

The storage capacitor Cst2 connects the one electrode and the gate electrode of the transistor T1.

The anode electrode of the organic light emitting diode OLED2 is connected to the other electrode of the transistor M1, and a cathode electrode of the organic light emitting diode OLED2 is connected to a second power voltage line ELVSS.

When a turn-on level (low level) scan signal is supplied to the gate electrode of the transistor T2 through the scan line Si, the transistor T2 connects the data line Dj and one electrode of the storage capacitor Cst2. Therefore, a voltage value corresponding to the difference between a data voltage DATAij applied to the data line Dj and a voltage of the first power voltage line ELVDD is written in the storage capacitor Cst2. The transistor T1 allows a driving current determined according to the voltage value written in the storage capacitor Cst2 to flow from the first power voltage line ELVDD to the second power voltage line ELVSS. The organic light emitting diode OLED emits light with a luminance corresponding to an amount of driving current.

Figure 7:
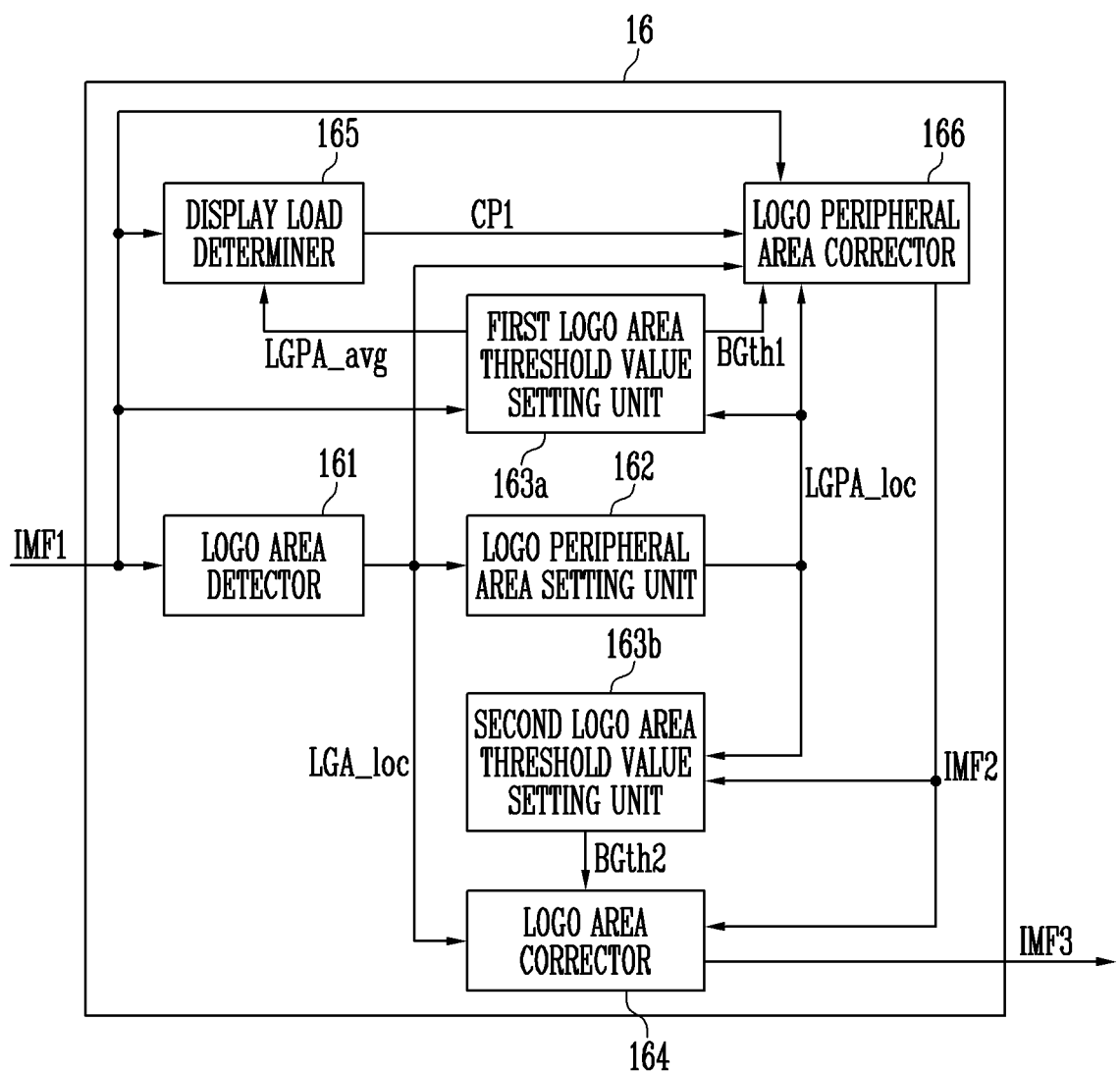
FIG. 7 is a diagram illustrating a logo controller according to some example embodiments of the present disclosure.

FIG. 7 is a diagram illustrating a logo controller according to some example embodiments of the present disclosure.

Referring to FIG. 7, the logo controller 16 according to some example embodiments of the present disclosure may include a logo area detector 161, a logo peripheral area setting unit 162, a first logo area threshold value setting unit 163a, a second logo area threshold value setting unit 163b, a logo area corrector 164, a display load determiner 165, and a logo peripheral area corrector 166.

The functional units 161 to 166 may be configured independently or integrally. Each of the functional units 161 to 166 may be configured in the form of an exclusive circuit, or be configured in a software manner to be driven in a general-purpose circuit. The general-purpose circuit may be a processor and a memory coupled to the processor, the memory storing instructions that, when executed by the processor, cause the processor to implement the functionality of the functional units 161 to 166.

The logo controller 16 may receive a first image frame IMF1 from the timing controller 11 and provide a corrected third image frame IMF3. In some embodiments, the third image frame IMF3 may be provided to the timing controller 11 or the data driver 12. In some cases, the third image frame IMF3 may be equal to the first image frame IMF1 or a second image frame IMF2. For example, when any logo is not detected, the third image frame IMF3 may be equal to the first image frame IMF1.

Hereinafter, each component of FIG. 7 will be described together with a corresponding drawing. In addition, each area described below may be defined in a unit of pixel PXij or PXij'. For example, each area may be defined in a unit of organic light emitting diode OLED1 or OLED2 of the pixel PXij or PXij'. For example, each area may include at least one organic light emitting diode OLED1 or OLED2.

Figure 8:
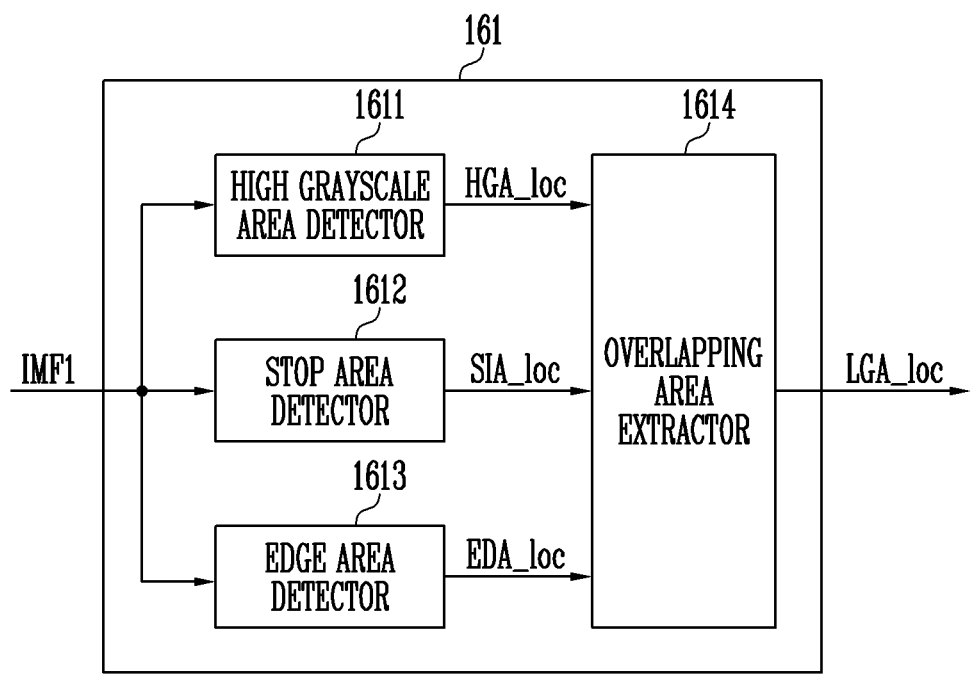
FIG. 8 is a diagram illustrating a logo area detector according to some example embodiments of the present disclosure.
Figure 9:
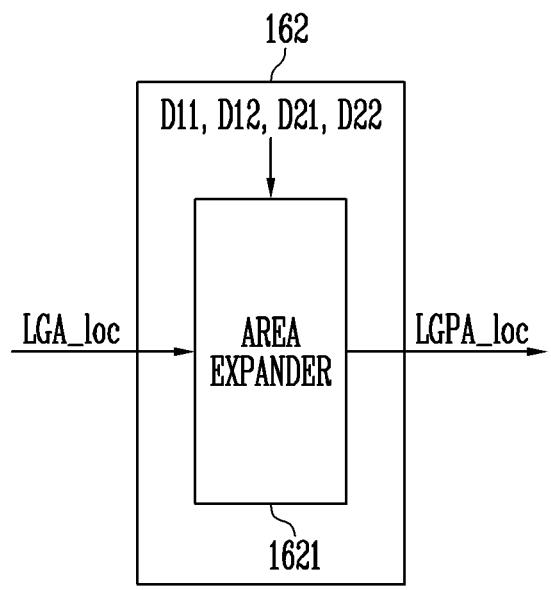
FIGS. 9 and 10 are diagrams illustrating a logo peripheral setting unit according to some example embodiments of the present disclosure.
Figure 10:
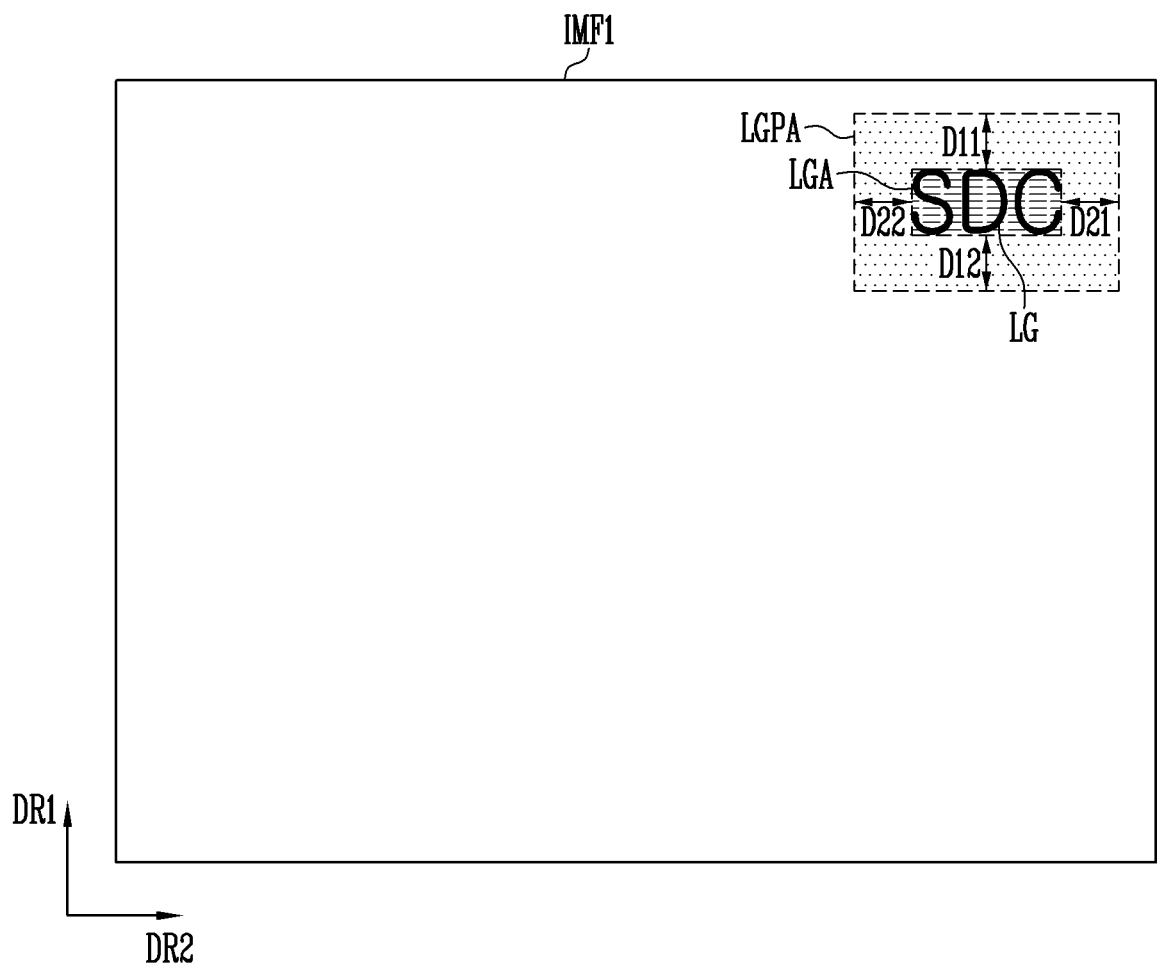

FIG. 8 is a diagram illustrating a logo area detector according to some example embodiments of the present disclosure. FIGS. 9 and 10 are diagrams illustrating a logo peripheral setting unit according to some example embodiments of the present disclosure.

The logo area detector 161 may receive the first image frame IMF1, and provide logo area location information LGA_loc.

The logo area detector 161 may detect a logo area LGA commonly included in a plurality of first image frames, based on the plurality of first image frames. The plurality of first image frames may be sequentially input first image frames.

For example, the logo area detector 161 may include a high grayscale area detector 1611, a stop area detector 1612, an edge area detector 1613, and an overlapping area extractor 1614.

The high grayscale area detector 1611 may receive the first image frame IMF1, and provide high grayscale area location information HGA_loc. For example, the high grayscale area detector 1611 may detect a high grayscale area commonly included in the plurality of first image frames, and provide location information of the high grayscale area as the high grayscale area location information HGA_loc.

The stop area detector 1612 may receive the first image frame IMF1, and provide stop area location information SIA_loc. For example, the stop area detector 1612 may detect a stop area commonly included in the plurality of first image frames, and provide location information of the stop area as the stop area location information SIA_loc.

The edge area detector 1613 may receive the first image frame IMF1, and provide edge area location information EDA_loc. For example, the edge area detector 1613 may detect an edge area commonly included in the plurality of first image frames, and provide location information of the edge area as the edge area location information EDA_loc.

The overlapping area extractor 1614 may receive the high grayscale area location information HGA_loc, the stop area location information SIA_loc, and the edge area location information EDA_loc, and provide the logo area location information LGA_loc. For example, the overlapping area extractor 1614 may extract, as the logo area LGA, an overlapping area of the high grayscale area based on the high grayscale location information HGA_loc, the stop area based on the stop area location information SIA_loc, and the edge area based on the edge area location information EDA_loc, and provided location information of the overlapping area as the logo area location information LGA_loc.

According to some example embodiments, an area including an edge while commonly maintaining a high grayscale state and a stop state in the plurality of sequential first image frames may be detected as the logo area LGA.

According to some example embodiments, the logo area LGA including a logo LG can be detected with a high probability without any complex algorithm for checking an accurate location of the logo LG.

The logo peripheral area setting unit 162 may receive the logo area location information LGA_loc, and provide logo peripheral area location information LGPA_loc. For example, the logo peripheral area setting unit 162 may include an area expander 1621. In some example embodiments, the area expander 1621 may be identical to the logo peripheral area setting unit 162.

The area expander 1621 may receive the logo area location information LGA_loc and first to fourth spacing distance values D11, D12, D21, and D22, and provide the logo peripheral area location information LGPA_loc.

For example, the area expander 1621 may set the outer edge of the logo peripheral area LGPA by expanding an outer edge of the logo area LGA in a first direction DR1 by the first spacing distance value D11 in the first direction DR1, expanding an outer edge of the logo area LGA in the opposite direction of the first direction DR1 by the second spacing distance value D12 in the opposite direction of the first direction DR1, expanding an outer edge of the logo area LGA in a second direction DR2 by the third spacing distance value D21 in the second direction, and expanding an outer edge of the logo area LGA in the opposite direction of the second direction DR2 by the fourth spacing distance value D22 in the opposite direction of the second direction DR2. In some example embodiments, the inner edge of the logo peripheral area LGPA may correspond to the outer edge of the logo area LGA. The area expander 1621 may provide location information of the logo peripheral area LGPA as the logo peripheral area location information LGPA_loc.

According to some example embodiments, the size of the logo peripheral area LGPA can be varied suitable for the size of the logo area LGA, and thus the logo peripheral area LGPA can be set corresponding to the logo area LGA having various shapes and sizes.

Figure 11:
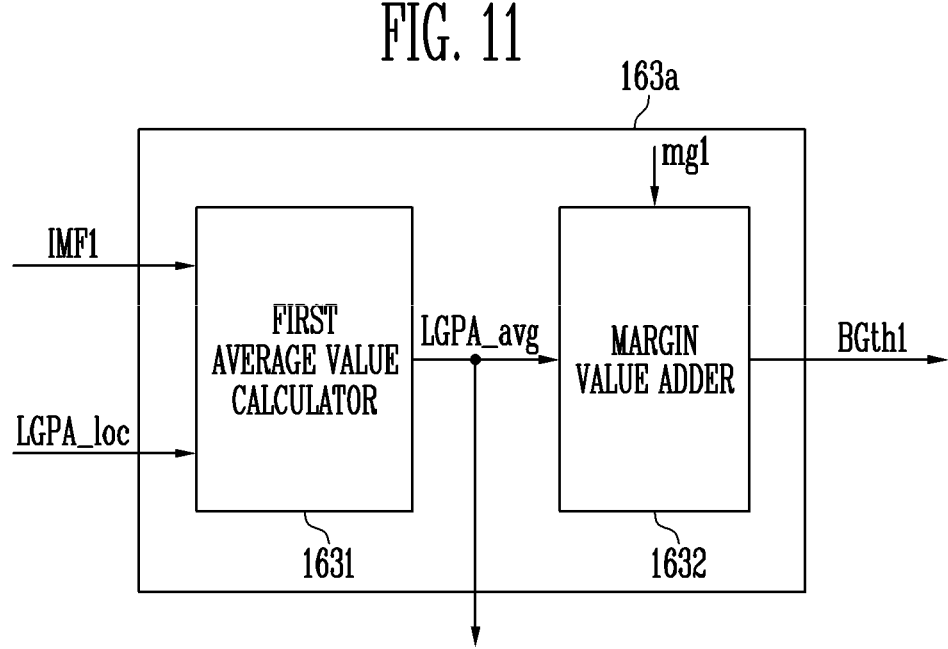
FIGS. 11 and 12 are diagrams illustrating a first logo area threshold value setting unit according to some example embodiments of the present disclosure.
Figure 12:
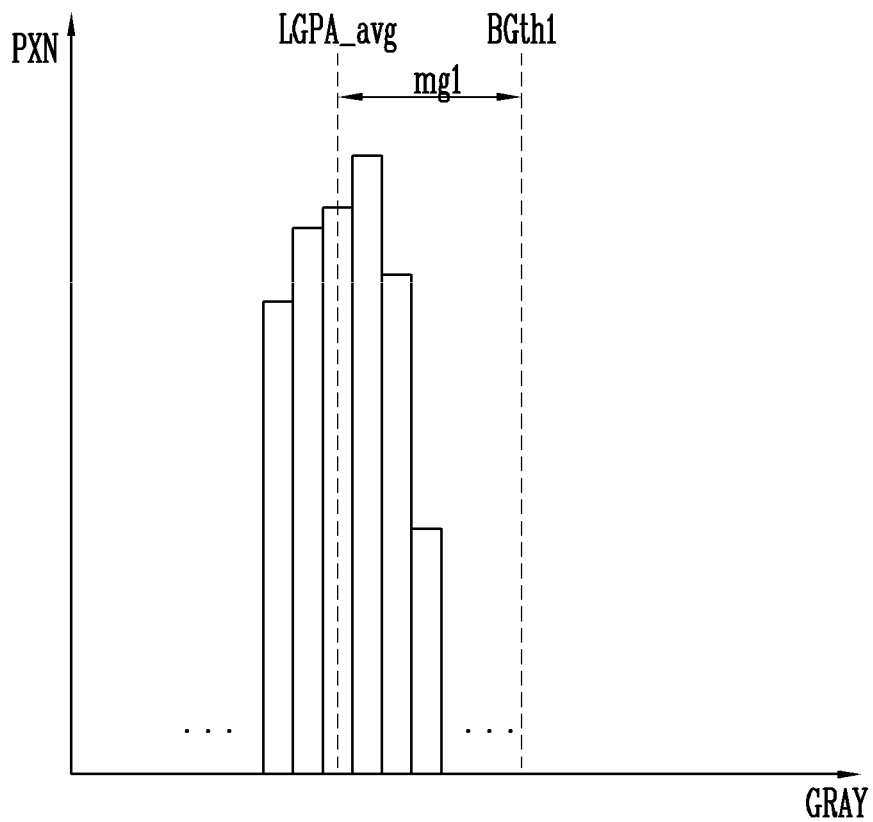

FIGS. 11 and 12 are diagrams illustrating a first logo area threshold value setting unit according to some example embodiments of the present disclosure.

The first logo area threshold value setting unit 163*a* may receive the first image frame IMF1 and the logo peripheral area location information LGPA_loc, and provide a first average value LGPA_avg and a first logo area threshold value BGth1. For example, the first logo area threshold value setting unit 163*a* may set the first logo area threshold value BGth1, based on grayscale values of the logo peripheral area LGPA of the first image frame IMF1. The first logo area threshold value setting unit 163*a* may include a first average value calculator 1631 and a margin value adder 1632.

The first average value calculator 1631 may receive the first image frame IMF1 and the logo peripheral area location information LGPA_loc, and provide the first average value LGPA_avg. For example, the first average value calculator 1631 may calculate the first average value LGPA_avg of the grayscale values of the logo peripheral area LGPA of the first image frame IMF1. A logo peripheral area representative value may correspond to the first average value LGPA_avg. In some embodiments, when the margin value adder 1632 does not exist, the first logo area threshold value BGth1 may correspond to the first average value LGPA_avg.

The margin value adder 1632 may provide the first average value LGPA_avg and a margin value mg1, and provide the first logo area threshold value BGth1. For example, the margin value adder 1632 may calculate the first logo area threshold value BGth1 by adding the margin value mg1 to the first average value LGPA_avg.

Referring to FIG. 12, a histogram is illustrated, in which the horizontal axis corresponds to grayscale value GRAY and the vertical axis corresponds to number PXN of pixels having a corresponding grayscale value GRAY in the logo peripheral area LGPA.

For example, the first average value LGPA_avg may be derived by adding values obtained by multiplying the grayscale values GRAY and numbers PXN of corresponding pixels and dividing a total number of pixels included in the logo peripheral area LGPA into the added value. That is, the first average value LGPA_avg may correspond to an average grayscale value of the pixels included in the logo peripheral area LGPA.

According to some example embodiments, the magnitude of the first logo area threshold value BFth1 can be varied suitable for the first average value LGPA_avg.

Figure 13:
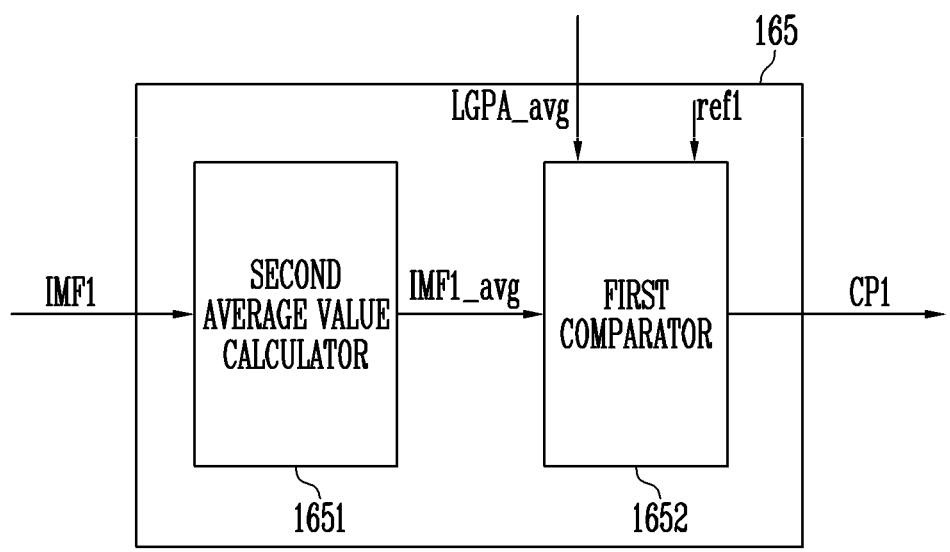
FIG. 13 is a diagram illustrating a display load determiner according to some example embodiments of the present disclosure.

FIG. 13 is a diagram illustrating a display load determiner according to some example embodiments of the present disclosure.

The display load determiner 165 may receive the first image frame IMF1 and the first average value LGPA_avg, and provide first comparison information CP1. For example, the display load determiner 165 may calculate a display load value, based on gray values of at least one first image frame IMF1, and determine whether the difference between the logo peripheral area representative value (e.g., the first average value LGPA_avg) and the display load value is equal to or smaller than a first reference value ref1. For example, the display load determiner 165 may include a second average value calculator 1651 and a first comparator 1652.

The second average value calculator 1651 may receive the first image frame IMF1, and provide a second average value IMF1_avg. For example, the second average value calculator 1651 may calculate the second average value IMF1_avg of grayscale values of at least one first image frame IMF1. The grayscale values of which second average value IMF1_avg is to be calculated may be grayscale values of all pixels of the first image frame IMF1 including the logo peripheral area LGPA and the logo area LGA. Therefore, the display load value may correspond to the second average value IMF1_avg.

The first comparator 1652 may receive the first average value LGPA_avg, the second average value IMF1_avg, and the first reference value ref1, and provide the first comparison information CP1. For example, the first comparator 1652 may determine whether the difference between the first average value LGPA_avg and the second average value IMF1_avg exceeds the first reference value ref1, and provide the first comparison information CP1 corresponding to the determination result.

When the difference between the first average value LGPA_avg and the second average value IMF1_avg does not exceed the first reference value ref1, it may be determined that the display load is relatively large. The first average value LPGA_avg may be larger than the second average value IMF1_avg. That the display load is relatively large may mean that the first image frame IMF1 is relatively bright.

In the following steps, the grayscale values of the logo peripheral area LGPA are not corrected, and only the grayscale values of the logo area LGA may be corrected to the first logo area threshold value BGth1 or less. A luminance of the logo area LGA viewed by a user mainly relies on a relative luminance of the logo peripheral area LGPA, and therefore, the logo LG of the logo area LGA of which grayscale values are decreased may be appropriately viewed by the user even when the display load is relatively large. The logo peripheral area corrector 166 which will be described later does not correct the first image frame IMF1, and may provide the first image frame as the second image frame IMF2. That is, the second image frame IMF2 may be equal to the first image frame IMF1.

When the difference between the first average value LGPA_avg and the second average value IMF1_avg exceeds the first reference value ref1, it may be determined that the display load is relatively small. The first average value LPGA_avg may be larger than the second average value IMF1_avg. That the display load is relatively small may mean that the first image frame IMF1 is relatively dark. The grayscale values of the logo peripheral area LGPA and the logo area LGA are further decreased according to a condition, and thus degradation of the pixels can be more effectively prevented or reduced. That is, the second image frame IMF2 may be equal to or different from the first image frame IMF1 according to a condition.

The first reference value ref1 may be selected as an appropriate grayscale value according to a product. For example, the first reference value ref1 may be set to grayscale 50.

Figure 14:
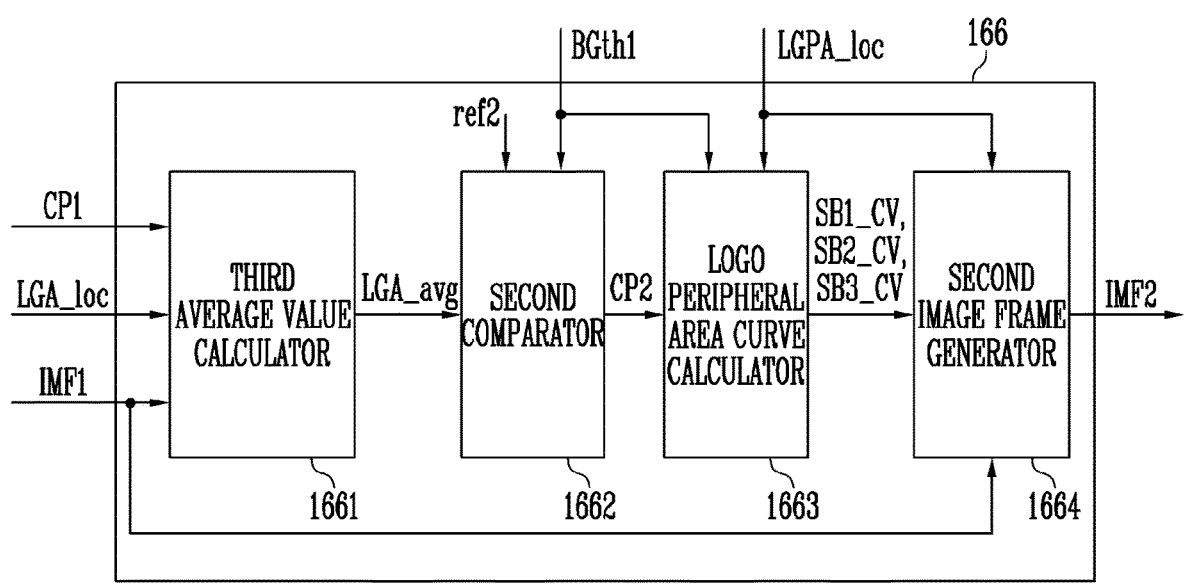
FIGS. 14, 15, and 16 are diagrams illustrating a logo peripheral area corrector according to some example embodiments of the present disclosure.
Figure 15:
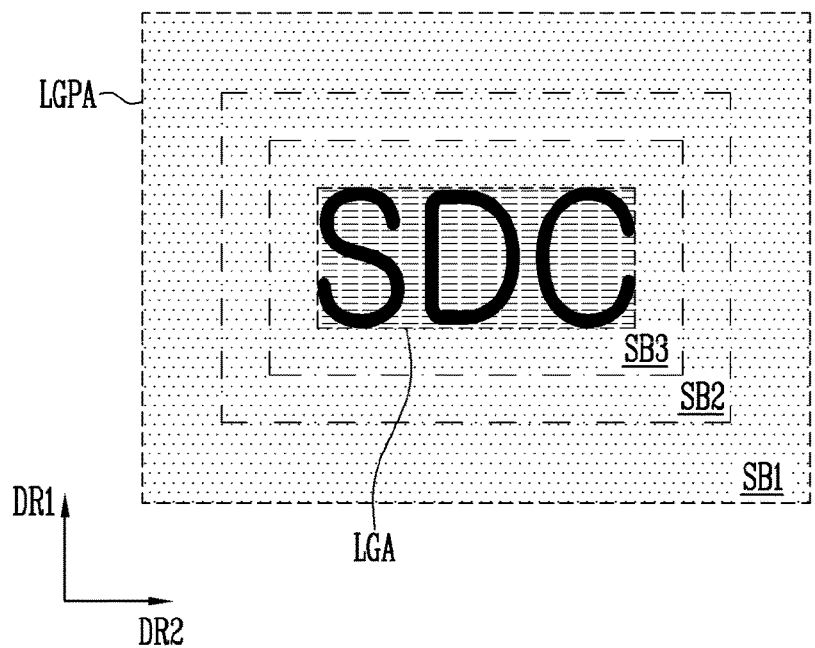
Figure 16:
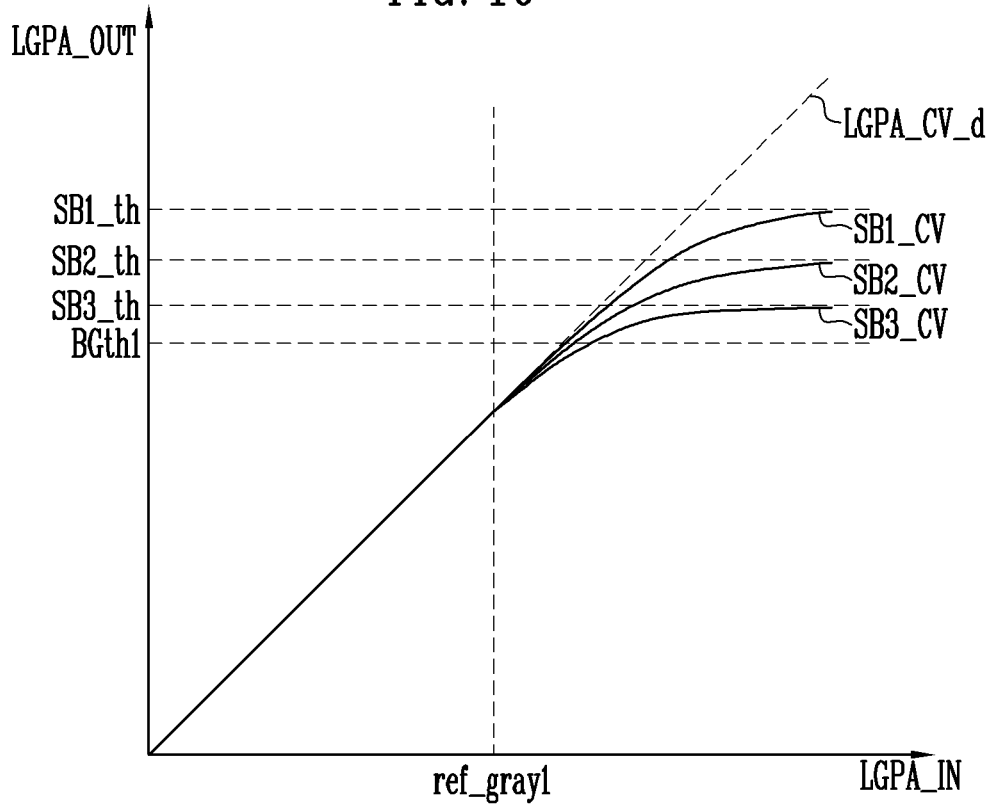

FIGS. 14, 15, and 16 are diagrams illustrating a logo peripheral area corrector according to some example embodiments of the present disclosure.

The logo peripheral area corrector 166 may receive the first image frame IMF1, the first comparison information CP1, the logo area location information LGA_loc, the logo peripheral area location information LGPA_loc, and the first logo area threshold value BGth1, and provide the second image frame IMF2. For example, when the display load value (e.g., the second average value IMF1_avg) is equal to or smaller than the first reference value ref1, and the difference between a logo area representative value (e.g., a third average value LGA_avg) based on the grayscale values of the logo area LGA and the first logo area threshold value BGth1 based on the grayscale values of the logo peripheral area LGPA is equal to or smaller than a second reference value ref2, the logo peripheral area corrector 166 may generate the second image frame IMF2 by decreasing at least some of the grayscale values of the logo peripheral area LGPA. For example, the logo peripheral area corrector 166 may include a third average value calculator 1661, a second comparator 1662, a logo peripheral area curve calculator 1663, and a second image frame generator 1664.

The third average value calculator 1661 may receive the first comparison information CP1, the logo area location information LGA_loc, and the first image frame IMF1, and provide the third average value LGA_avg. The logo area representative value may correspond to the third average value LGA_avg. For example, the third average value calculator 1661 may calculate the third average value LGA_avg of the grayscale values of the logo area LGA of the first image frame IMF1.

The second comparator 1662 may receive the third average value LGA_avg, the second reference value ref2, and the first logo area threshold value BGth1, and provide second comparison information CP2. For example, the second comparator 1662 may compare whether the difference between the third average value LGA_avg and the first logo area threshold value BGth1 is equal to or smaller than the second reference value ref2, and provide the comparison result as the second comparison information CP2.

When the difference between the third average value LGA_avg and the first logo area threshold value BGth1 exceeds the second reference value ref2, it may be determined that the grayscale values of the logo peripheral area LGPA are relatively small. Because grayscale values of pixels corresponding to the logo LG are sufficiently decreased by the logo area corrector 164, degradation of the pixels can be prevented or reduced, and hence it may be unnecessary to correct the logo peripheral area LGPA. Therefore, the logo peripheral area corrector 166 may provide the second image frame IMF2 equal to the first image frame IMF1.

Referring to the description of the logo area detector 161, because the pixels corresponding to the logo LG have high grayscale values, it may be determined that the grayscale values of the logo peripheral area LGPA are relatively large, when the difference between the third average value LGA_avg and the first logo area threshold value BGth1 is equal to or smaller than the second reference value ref2. When the grayscale values of the logo peripheral area LGPA relies on the first logo area threshold value BGth1, the grayscale values of the pixels corresponding to the logo LG may be sufficiently decreased. Hence, it is necessary to generate a second logo area threshold value lower than the first log area threshold value BGth1 by decreasing the grayscale values of the logo peripheral area LGPA. Therefore, the logo peripheral area corrector 166 may provide the second image frame IMF2 different from the first image frame IMF1.

The second reference value ref2 may be selected as an appropriate grayscale value according to a product. For example, the second reference value ref2 may be set to grayscale 20.

The logo peripheral area curve calculator 1663 may receive the second comparison information CP2, the first logo area threshold value BGth1, and the logo peripheral area location information LGPA_loc, and provide first mapping curves SB1_CV, SB2_CV, and SB3_CV. For example, when the difference between the third average value LGA_avg and the first logo area threshold value BGth1 is equal to or smaller than the second reference value ref2, the logo peripheral area curve calculator 1663 may calculate the first mapping curves SB1_CV, SB2_CV, and SB3_CV that respectively limit grayscale values of sub-areas SB1, SB2, and SB3 of the logo peripheral area LGPA respectively to sub-area threshold values SB1_th, SB2_th, ad SB3_th or less.

The second image frame generator 1664 may receive the logo peripheral area location information LGPA_loc, the first image frame IMF1, and the first mapping curves SB1_CV, SB2_CV, and SB3_CV, and provide the second image frame IMF2. For example, the second image frame generator 1664 may generate the second image frame IMF2 by decreasing at least some of the grayscale values of the sub-areas SB1, SB2, and SB3 of the first image frame IMF1, based on the first mapping curves SB1_CV, SB2_CV, and SB3_CV.

Referring to FIG. 15, the sub-areas SB1, SB2, and SB3 may be sequentially set according to distances from the logo area LGA. For example, the sub-area SB1 among the sub-areas SB1, SB2, and SB3 is most distant from the logo area LGA, and the sub-area SB3 among the sub-areas SB1, SB2, and SB3 may be closest to the logo area LGA.

In some example embodiments, the sub-areas SB1, SB2, and SB3 may not overlap with each other. For example, the sub-area SB1 located relatively distant from the logo area LGA may surround the sub-area SB2 located relatively close to the logo area LGA.

Referring to FIG. 16, a graph is illustrated, in which the horizontal axis represents input grayscale values LGPA_IN of the logo peripheral area LGPA, and the vertical axis represents correction grayscale values LGPA_OUT of the logo peripheral area LGPA.

According to a default mapping curve LGPA_CV_d, the input grayscale values LGPA_IN may be maintained as the same grayscale value without correction. That is, the slope of the default mapping curve LGPA_CV_d may be 1.

The first mapping curves SB1_CV, SB2_CV, and SB3_CV may be set such that the slopes of the first mapping curves SB1_CV, SB2_CV, and SB3_CV are provided as 1 from grayscale 0 to a first reference grayscale ref_gray1, and are gradually decreased after the first reference grayscale ref_gray1. When the grayscale 0 may be a black grayscale, and the last grayscale (grayscale 255 in the case of 8-bit data) may be a white grayscale. The correction grayscale values LGPA_OUT according to the first mapping curves SB1_CV, SB2_CV, and SB3_CV may converge on corresponding sub-area threshold values SB1_th, SB2_th, and SB3_th.

The sub-area threshold values SB1_th, SB2_th, and SB3_th may decrease as the corresponding sub-areas SB1, SB2, and SB3 are closer to the logo area LGA. Therefore, the luminance of the sub-area SB3 most adjacent to the logo area LGA is most decreased, so that the luminance of a relative logo LG can stand out.

The sub-area threshold values SB1_th, SB2_th, and SB3_th may be larger than or equal to the first logo area threshold value BGth1. Thus, irregular grayscale expression with respect to the same input grayscale can be prevented or reduced. This will be described in more detail with reference to FIG. 18.

In some example embodiments, values of the first reference grayscale ref_gray1 may be set differently from the respective first mapping curves SB1_CV, SB2_CV, and SB3_CV. For example, the values of the first reference grayscale ref_gray1 may rely on corresponding sub-area threshold values SB1_th, SB2_th, and SB3_th. For example, when the sub-area threshold values SB1_th, SB2_th, and SB3_th decrease, the values of the first reference grayscale ref_gray1 may be set to decrease.

In some example embodiments, the first mapping curves SB1_CV, SB2_CV, and SB3_CV may be set such that the slopes of the first mapping curves SB1_CV, SB2_CV, and SB3_CV are gradually decreased even from the grayscale 0 to the first reference grayscale ref_gray1.

The first mapping curves SB1_CV, SB2_CV, and SB3_CV may be stored in advance in a memory in the form of a look-up table in which the correction grayscale values LGPA_OUT corresponding to the input grayscale values LGPA_IN are recorded.

In some example embodiments, the first mapping curves SB1_CV, SB2_CV, and SB3_CV may be stored in advance in the memory in the form of a look-up table with respect to only some correction grayscale values corresponding to some input grayscale values, and may be generated using a method such as interpolation with respect to the other correction grayscale values corresponding to the other input grayscale values.

In some example embodiments, the first mapping curves SB1_CV, SB2_CV, and SB3_CV are not configured with data but may be configured in an equation form. A corresponding equation may be stored in the form of an algorithm in the memory, or be directly implemented with an exclusive-purpose circuit.

According to some example embodiments, the grayscale values of the sub-areas SB1, SB2, and SB3 of the logo peripheral area LGPA may be corrected to the corresponding sub-area threshold values SB1_th, SB2_th, and SB3_th or less according to a condition. When the grayscale values of the sub-areas SB1, SB2, and SB3 of the logo peripheral area LGPA are corrected, the second image frame IMF2 may be different from the first image frame IMF1. When the grayscale values of the sub-areas SB1, SB2, and SB3 of the logo peripheral area LGPA are not corrected, the second image frame IMF2 may be equal to the first image frame IMF1.

The second logo area threshold value setting unit 163b may receive the second image frame IMF2 and the logo peripheral area location information LGPA_loc, and provide a second logo threshold value BGth2. For example, the second logo area threshold value setting unit 163b may set the second logo threshold value BGth2, based on the grayscale values of the logo peripheral area LGPA of the second image frame IMF2. For example, similarly to the first logo area threshold value setting unit 163a, the second logo area threshold value setting unit 163b may include a first average value calculator and a margin value adder. The second logo area threshold value setting unit 163b may be configured substantially identical to the first logo area threshold value setting unit 163a. Therefore, the second logo area threshold value setting unit 163b is not illustrated in a separate drawing.

However, the second logo area threshold value setting unit 163b is different from the first logo area threshold value setting unit 163a, in that the second logo area threshold value BGth2 is set based on the second image frame IMF2. At least some of the grayscale values of the logo peripheral area LGPA of the corrected second image frame IMF2 are smaller than grayscale values corresponding to the logo peripheral area LGPA of the first image frame IMF1. Therefore, the second logo area threshold value BGth2 may be smaller than the first logo area threshold value BGth1.

When the second image frame IMF2 is equal to the first image frame IMF1, the second logo area threshold value BGth2 may be equal to the first logo area threshold value BGth1.

Figure 17:
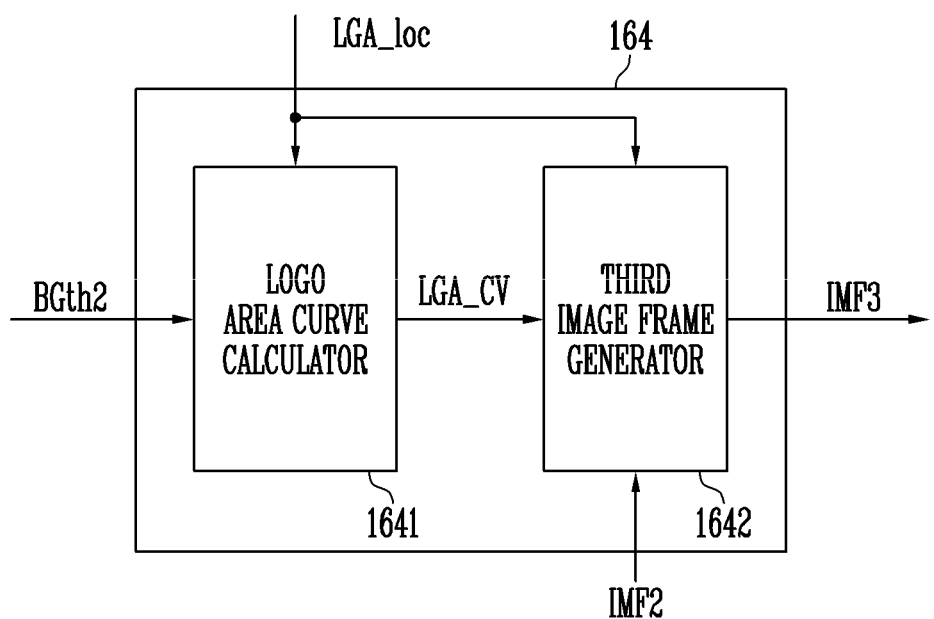
FIGS. 17 and 18 are diagrams illustrating a logo area corrector according to some example embodiments of the present disclosure.
Figure 18:
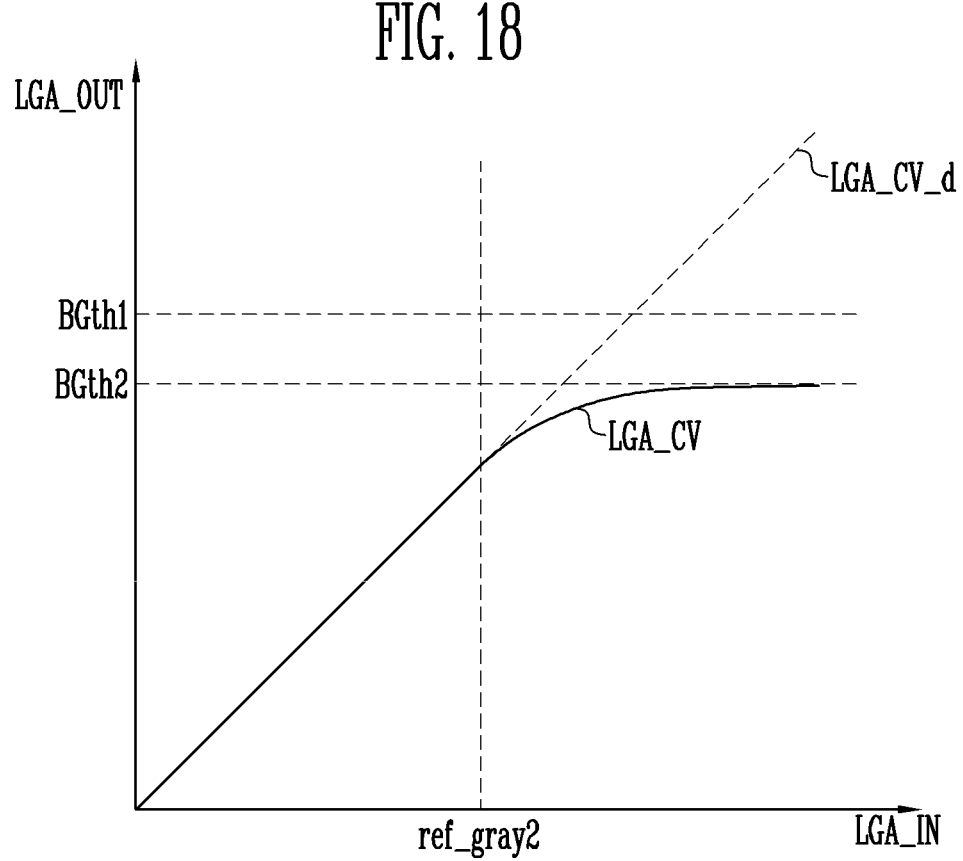

FIGS. 17 and 18 are diagrams illustrating a logo area corrector according to some example embodiments of the present disclosure.

The logo area corrector 164 may receive the second image frame IMF2, the logo area location information LGA_loc, and the second logo area threshold value BGth2, and provide a third image frame IMF3. For example, the logo area corrector 164 may correct the grayscale values of the logo area LGA of the second image frame IMF2 to the second logo area threshold value BGth2 or less. For example, the logo area corrector 164 may include a logo area curve calculator 1641 and a third image frame generator 1642.

The logo area curve calculator 1641 may receive the second logo area threshold value BGth2 and the logo area location information LGA_loc, and provide a second mapping curve LGA_CV. For example, the logo area curve calculator 1641 may calculate the second mapping curve LGA_CV that limits the grayscale values of the logo area LGA of the second image frame to the second logo area threshold value BGth2 or less.

The third image frame generator 1642 may receive the logo area location information LGA_loc, the second image frame IMF2, and the second mapping curve LGA_CV, and provide the third image frame IMF3. For example, the third image frame generator 1642 may generate the third image frame IMF3 by decreasing at least some of the grayscale values of the logo area LGA of the second image frame IMF2, based on the second mapping curve LGA_CV.

Referring to FIG. 18, a graph is illustrated, in which the horizontal axis represents input grayscale values LGA_IN of the logo area LGA, and the vertical axis represents correction grayscale values LGA OUT of the logo area LGA.

According to a default mapping curve LGPA_CV_d, the input grayscale values LGPA_IN may be maintained as the same grayscale value without correction. That is, the slope of the default mapping curve LGPA_CV_d may be 1.

The second mapping curve LGA_CV may be set such that the slope of the second mapping curve LGA_CV is provided as 1 from grayscale 0 to a second reference grayscale ref_gray2, and is gradually decreased after the second reference grayscale ref_gray2. When the grayscale 0 may be a black grayscale, and the last grayscale (grayscale 255 in the case of 8-bit data) may be a white grayscale. The correction grayscale values LGPA_OUT according to the second mapping curve LGA_CV may converge on the second logo area threshold value BGth2.

In some example embodiments, a value of the second reference grayscale ref_gray2 may rely on the second logo area threshold value BGth2. For example, when the second logo area threshold value BGth2 decreases, the value of the second reference grayscale ref_gray2 may be set to decrease.

In some example embodiments, the second mapping curve LGA_CV may be set such that the slope of the second mapping curve LGA_CV are gradually decreased even from the grayscale 0 to the second reference grayscale ref_gray2.

The second mapping curve LGA_CV may be stored in advance in a memory in the form of a look-up table in which the correction grayscale values LGPA_OUT corresponding to the input grayscale values LGPA_IN with respect to each second logo area threshold value BGth2 are recorded.

In some example embodiments, the second mapping curve LGA_CV may be stored in advance in the memory in the form of a look-up table with respect to only some second logo area threshold values, and be generated using a method such as interpolation with respect to the other second logo area threshold values.

In some example embodiments, the second mapping curve LGA_CV is not configured with data but may be configured in an equation form. A corresponding equation may be stored in the form of an algorithm in the memory, or be directly implemented with an exclusive-purpose circuit.

According to some example embodiments, the grayscale values of the logo area LGA may be corrected to the second logo area threshold value BGth2 or less. In general, the logo LG in the logo area LGA is configured with high grayscales (e.g., grayscales exceeding the second reference grayscale ref_gray2), and therefore, grayscales of pixels corresponding to the logo LG may be decreased according to the second mapping curve LGA_CV. On the other hand, pixels that do not correspond to the logo LG in the logo area LGA are configured with relatively low grayscales (e.g., grayscales equal to or smaller than the second reference grayscale ref_gray2), and therefore, a grayscale decrement of the pixels that do not correspond to the logo LG according to the second mapping curve LGA_CV may be insignificant. Thus, although the logo area LGA that does not correspond to the logo LG is detected by the logo area detector 161, grayscale values of the pixels corresponding to the logo LG can be selectively decreased.

When the second image frame IMF2 is different from the first image frame IMF1, the second logo area threshold value BGth2 is smaller than the first logo area threshold value BGth1. Thus, according to some example embodiments, the grayscale values of the pixels corresponding to the logo LG can be further decreased, and degradation of the corresponding pixels can be further prevented or reduced.

In addition, referring to FIGS. 16 and 18, the second logo area threshold value BGth2 set to the first logo area threshold value BGth1 can be guaranteed such that it is lower than the sub-area threshold values SB1_th, SB2_th, and SB3_th. Thus, output grayscale values of the sub-area SB1, the sub-area SB2, the sub-area SB3, and the logo area LGA are sequentially lowered with respect to a specific input grayscale value, and accordingly, irregular grayscale expression can be prevented or reduced.

Figure 19:
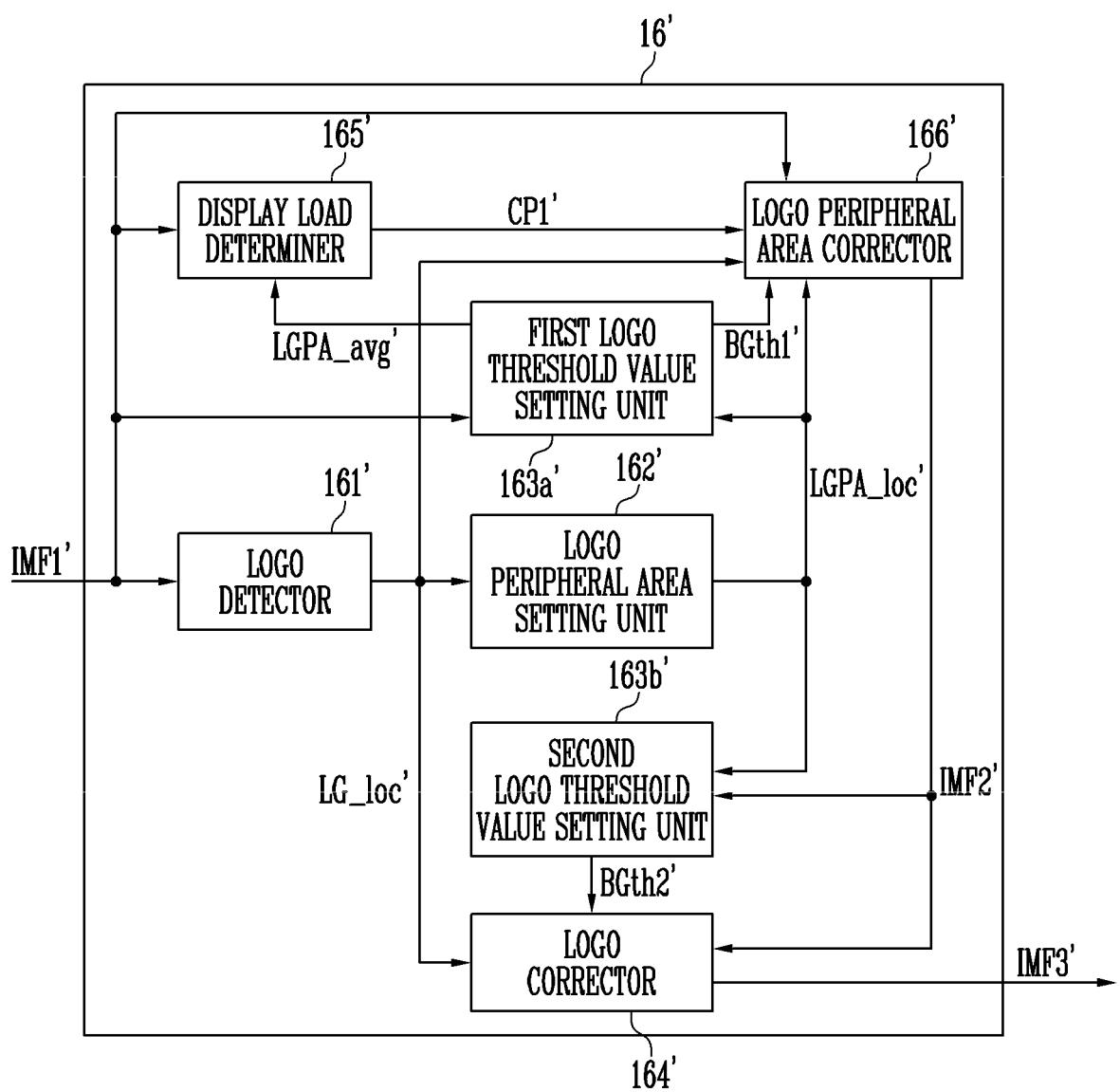
FIG. 19 is a diagram illustrating a logo controller according to some example embodiments of the present disclosure.

FIG. 19 is a diagram illustrating a logo controller according to some example embodiments of the present disclosure.

Referring to FIG. 19, the logo controller 16' according to some example embodiments of the present disclosure may include a logo detector 161', a logo peripheral area setting unit 162', a first logo threshold value setting unit 163a', a second logo threshold value setting unit 163b', a logo corrector 164', a display load determiner 165', and a logo peripheral area corrector 166'.

The logo controller 16' of FIG. 19 is different from the logo controller 16 of FIG. 7, in that the logo area threshold values BGth1 and BGth2 are not set after the logo area LGA is detected, but logo threshold values BGth1' and BGth2' are set after the logo LG is detected.

Therefore, as compared with FIG. 7, in the logo controller 16' of FIG. 19, the logo area detector 161 has been replaced with the logo detector 161', the first logo area threshold value setting unit 163a has been replaced with the first logo threshold value setting unit 163a', the second logo area threshold value setting unit 163b has been replaced with the second logo threshold value setting unit 163b', and the logo area corrector 164 has been replaced with the logo corrector 164'. Other similar components are illustrated by adding apostrophe to their reference numerals.

The logo detector 161' may receive a first image frame IMF1', and provide logo location information LG_loc'. For example, the logo detector 161' may detect a logo commonly included in a plurality of first image frames, based on the plurality of first image frames.

Unlike the logo area detector 161, the logo detector 161' may provide location information of the logo LG instead of the logo area LGA. The existing algorithm such as machine learning or deep learning may be used as a detection algorithm of the logo LG.

The logo peripheral area setting unit 162' may set a logo peripheral area expanded from the logo.

The display load determiner 165' may calculate a display load value, based on grayscale values of at least one first image frame IMF1', and determine whether the display load value is equal to or smaller than a first reference value.

When the display load value is equal to or smaller than the first reference value, and the difference between a logo representative value based on grayscale values of the logo and a first logo threshold value BGth1' based on grayscale values of the logo peripheral area is equal to or smaller than a second reference value, the logo peripheral area corrector 166' may generate a second image frame IMF2 by decreasing at least some of the grayscale values of the logo peripheral area.

In addition, overlapping descriptions of components similar to those of the logo controller 16 of FIG. 7 will be omitted.

Figure 20:
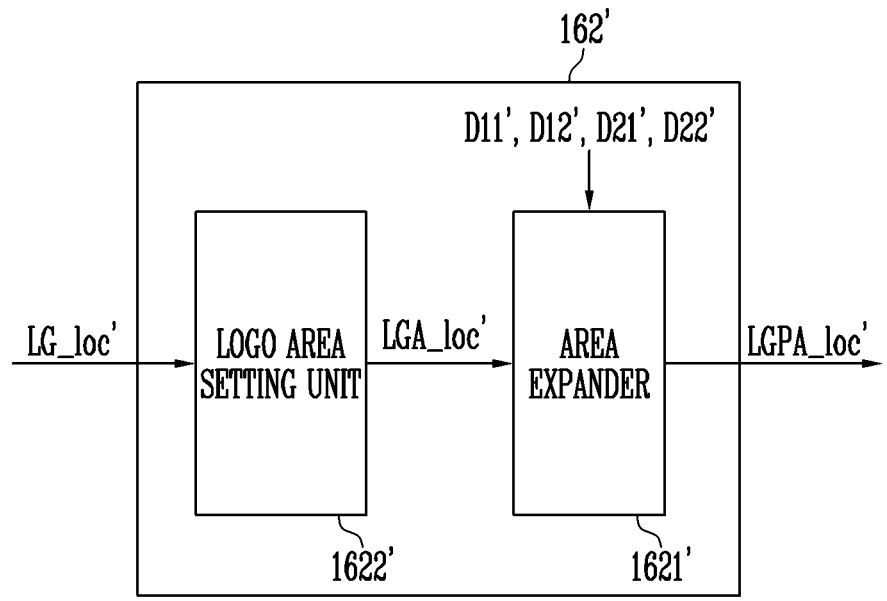
FIGS. 20 and 21 are diagrams illustrating a logo peripheral area setting unit according to some example embodiments of the present disclosure.
Figure 21:
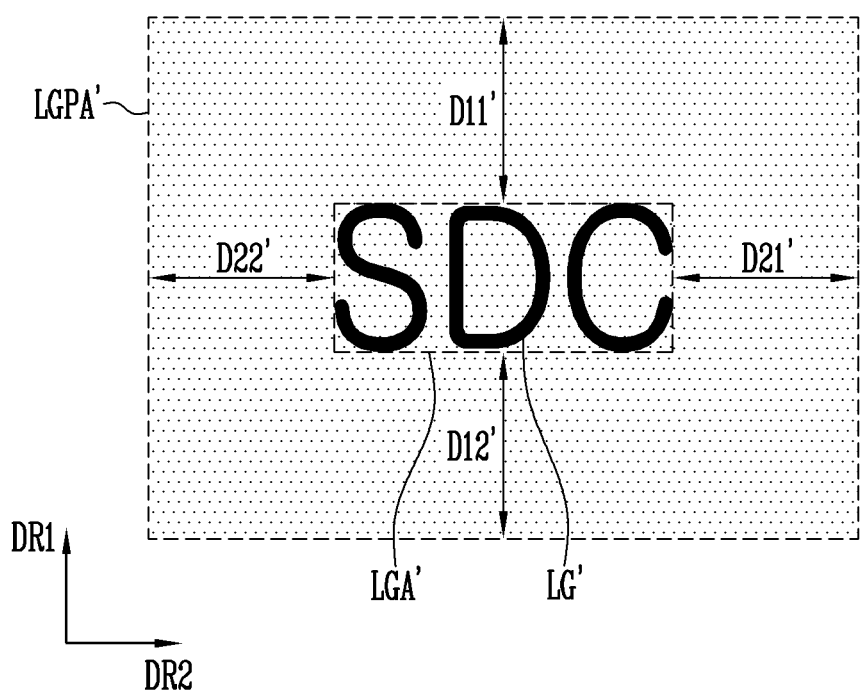

FIGS. 20 and 21 are diagrams illustrating a logo peripheral area setting unit according to some example embodiments of the present disclosure.

The logo peripheral area setting unit 162' may receive the logo location information LG_loc', and provide logo peripheral area location information LGPA_loc'. For example, the logo peripheral area setting unit 162' may include a logo area setting unit 1622' and an area expander 1621'.

The logo area setting unit 1622' may receive the logo location information LG_loc', and provide a logo area location information LGA_loc'. For example, the logo area setting unit 1622' may set a logo area LGA' that surrounds the outer edge of a logo LG' with a plurality of straight lines, and provide location information on the logo area LGA' as the logo area location information LGA_loc'.

The area expander 1621' may receive the logo area location information LGA_loc' and first to fourth spacing distance values D11', D12', D21', and D22', and provide the logo peripheral area location information LGPA_loc'. For example, the area expander 1621' may set the outer edge of a logo peripheral area LGPA' by expanding the outer edge of the logo area LGA' according to the predetermined spacing distance values D11', D12', D21', and D22'. However, the inner edge of the logo peripheral area LGPA' of FIG. 21 corresponds to the outer edge of the logo LG', and the inner edge of the logo peripheral area LGPA of FIG. 10 corresponds to the outer edge of the logo area LGA, which are different from each other.

Figure 22:
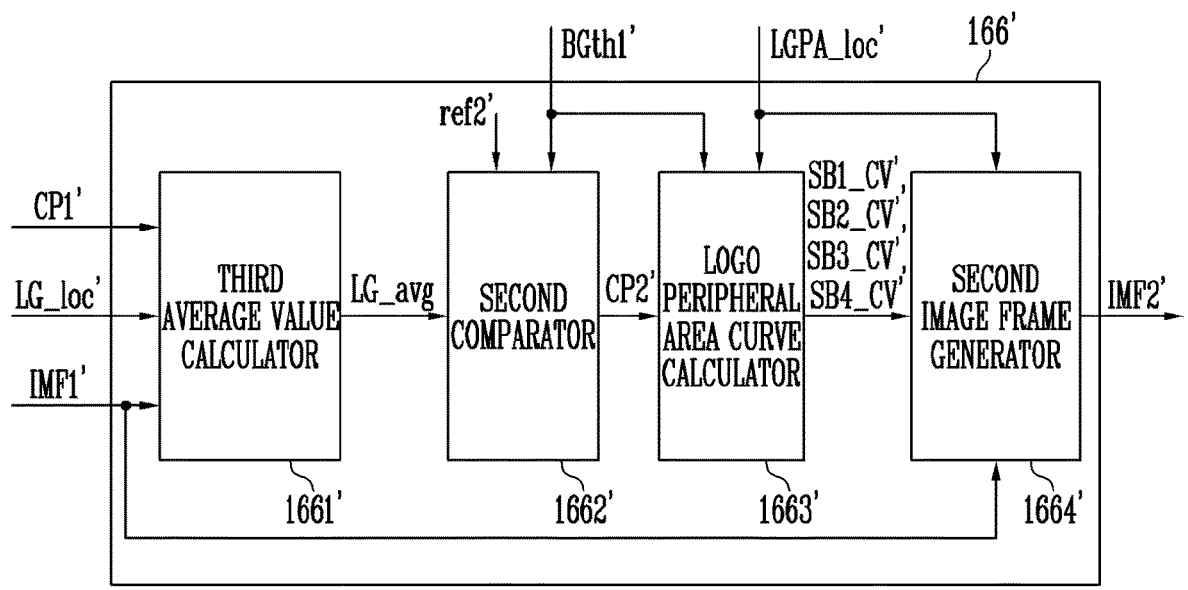
FIGS. 22, 23, and 24 are diagrams illustrating a logo peripheral area corrector according to some example embodiments of the present disclosure.
Figure 23:
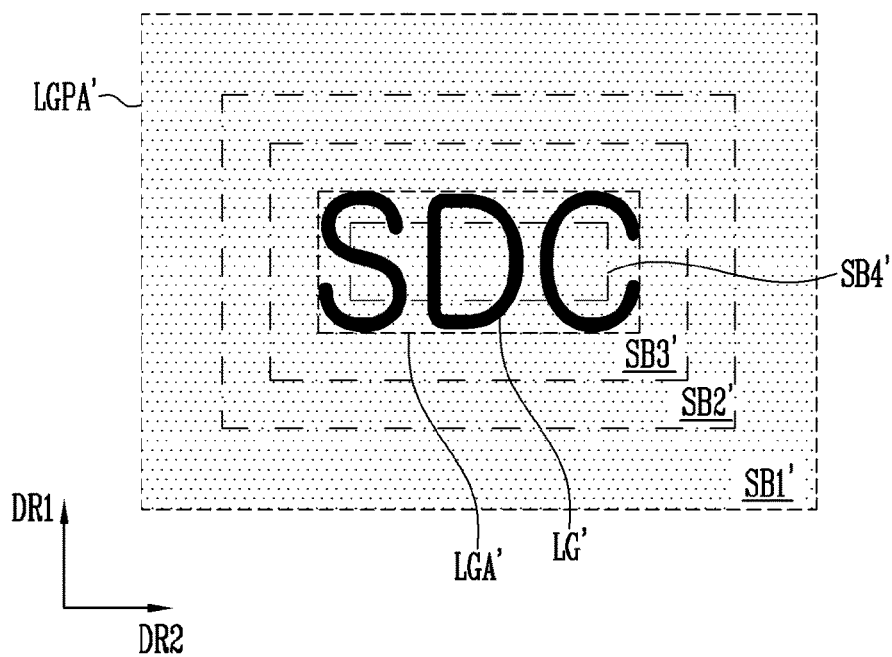
Figure 24:
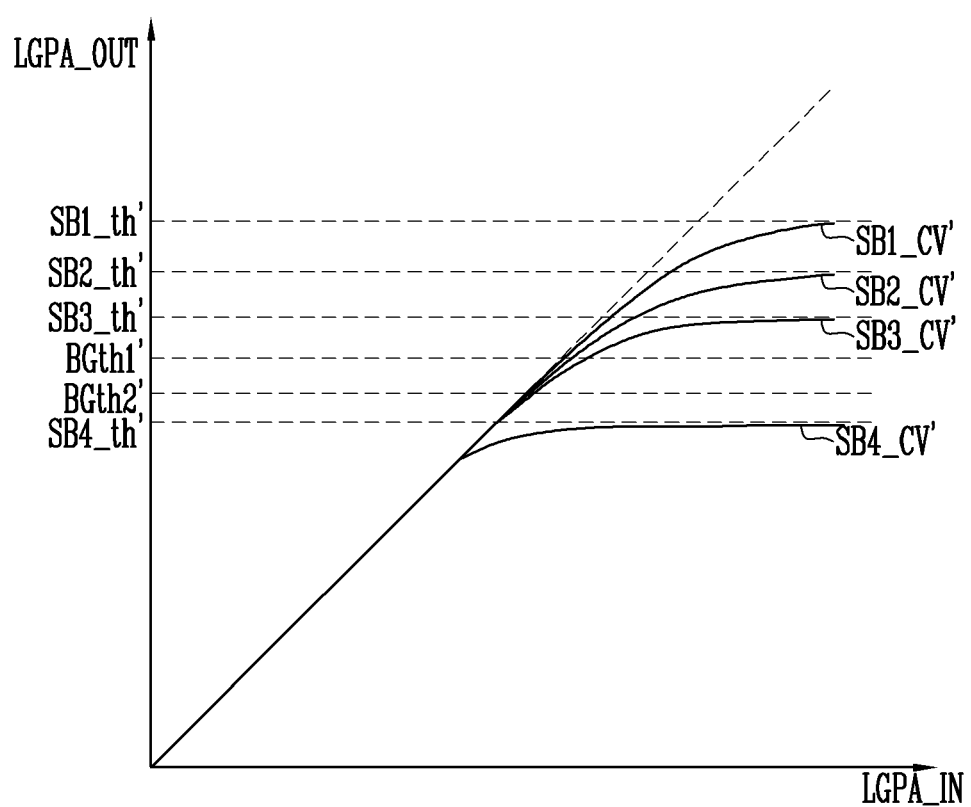

FIGS. 22, 23, and 24 are diagrams illustrating a logo peripheral area corrector according to some example embodiments of the present disclosure.

The logo peripheral area corrector 166' may include a third average value calculator 1661', a second comparator 1662, a logo peripheral area curve calculator 1663', and a second image frame generator 1664'. Hereinafter, overlapping descriptions of components substantially identical to those of FIG. 14 will be omitted.

When the difference between a logo representative value (e.g., a third average value LG_avg') and the first logo threshold value BGth1' is equal to or smaller than a second reference value ref2', the logo peripheral area curve calculator 1663' may calculate first mapping curves SB1_CV', SB2_CV', SB3_CV', and SB4_CV' that limit grayscale values of sub-areas SB1', SB2', SB3', and SB4' of the logo peripheral area LGPA' respectively to sub-area threshold values SB1_$th$', SB2_$th$', SB3_$th$', and SB4_$th$' or less.

Referring to FIG. 23, the sub-areas SB1', SB2', SB3', and SB4' may be sequentially set according to their distances from the center of the logo peripheral area LGPA'. For example, the sub-area SB1' among the sub-areas SB1', SB2', SB3', and SB4' may be most distant from the center of the logo peripheral area LGPA', and the sub-area SB4' among the sub-areas SB1', SB2', SB3', and SB4' may be closest to the center of the logo peripheral area LGPA'.

In some example embodiments, the sub-areas SB1', SB2', SB3', and SB4' do not overlap with each other. For example, the sub-area SB1' located relatively distant from the center of the logo peripheral area LGPA' may surround the sub-area SB2' located relatively close to the center of the logo peripheral area LGPA'.

As compared with FIG. 15, some example embodiments, as illustrated in FIG. 23, may further include the sub-area SB4'. The sub-area SB4' may be an area included inside the outer edge line of the logo area LGA'. The sub-area SB4' does not overlap with the logo LG'. That is, pixels constituting the sub-area SB4' may be different from those constituting the logo LG'.

Referring to FIG. 24, the first mapping curves SB1_CV', SB2_CV', SB3_CV', and SB4_CV' are illustrated.

In some example embodiments, the first log threshold value BGth1' may be larger than a minimum value SB4_$th$' of the sub-area threshold values SB1_$th$', SB2_$th$', SB3_$th$', and SB4_$th$', and be smaller than a maximum value SB1_$th$' of the sub-area threshold values SB1_$th$', SB2_$th$', SB3_$th$', and SB4_$th$'. That is, the sub-area threshold value SB4_$th$' of the sub-area SB4' is set smaller than the first logo threshold value BGth1', so that irregular grayscale expression with respect to the same input grayscale can be prevented or reduced while increasing a relative luminance of the logo LG'.

In some example embodiments, a second logo threshold value BGth2' set after the first logo threshold value BGth1' is lower than the first logo threshold value BGth1', but may maintain a value between the sub-area threshold value SB3_$th$' and the sub-area threshold value SB4_$th$'.

In the logo controller and the logo control method according to some example embodiments of the present disclosure, grayscale values of a logo area and a logo peripheral area can be adjusted depending on a display load.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Aspects of some example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims, and their equivalents.

What is claimed is:

1. A logo controller comprising:
   a logo area detector configured to detect a logo area commonly included in a plurality of first image frames, based on the plurality of first image frames;
   a logo peripheral area setting unit configured to set a logo peripheral area expanded from the logo area;
   a display load determiner configured to calculate a display load value, based on grayscale values of at least one first image frame, and determine a difference between a logo peripheral area representative value based on grayscale values of the logo peripheral area and the display load value exceeds a first reference value; and a logo peripheral area corrector configured to generate a second image frame by decreasing at least some of the grayscale values of the logo peripheral area, when the difference between the logo peripheral area representative value and the display load value exceeds the first reference value, and the difference between a logo area representative value based on grayscale values of the logo area and a first logo area threshold value based on the grayscale values of the logo peripheral area is equal to or smaller than a second reference value.

2. The logo controller of claim 1, further comprising a first logo area threshold value setting unit configured to set the first logo area threshold value, based on the grayscale values of the logo peripheral area.

3. The logo controller of claim 2, wherein the first logo area threshold value setting unit includes:
   a first average value calculator configured to calculate a first average value of the grayscale values of the logo peripheral area of the first image frame; and
   a margin value adder configured to calculate the first logo area threshold value by adding a margin value to the first average value,
   wherein the logo peripheral area representative value corresponds to the first average value.

4. The logo controller of claim 3, wherein the display load determiner includes:
   a second average value calculator configured to calculate a second average value of the grayscale values of the at least one first image frame; and
   a first comparator configured to determine whether the difference between the first average value and the second average value exceeds the first reference value,
   wherein the display load value corresponds to the second average value.

5. The logo controller of claim 4, wherein the logo peripheral area corrector includes a third average value calculator configured to calculate a third average value of the grayscale values of the logo area of the first image frame,
   wherein the logo area representative value corresponds to the third average value.

6. The logo controller of claim 5, wherein the logo peripheral area corrector further includes:
   a second comparator configured to compare whether a difference between the third average value and the first logo area threshold value is equal to or smaller than the second reference value;
   a logo peripheral area curve calculator configured to calculate first mapping curves that limit grayscale values of sub-areas of the logo peripheral area respectively to sub-area threshold values or less, when the difference between the third average value and the first logo area threshold value is equal to or smaller than the second reference value; and
   a second image frame generator configured to generate the second image frame by decreasing at least some of the grayscale values of the sub-areas of the first image frame, based on the first mapping curves.

7. The logo controller of claim 6, wherein the sub-area threshold values decrease as corresponding sub-areas are closer to the logo area.

8. The logo controller of claim 7, wherein the sub-area threshold values are larger than or equal to the first logo area threshold value.

9. The logo controller of claim 6, further comprising a second logo area threshold value setting unit configured to set a second logo area threshold value, based on grayscale values of the logo peripheral area of the second image frame.

10. The logo controller of claim 9, further comprising a logo area corrector configured to correct grayscale values of the logo area of the second image frame to the second logo area threshold value or less.

11. The logo controller of claim 10, wherein the logo area corrector includes:
    a logo area curve calculator configured to calculate a second mapping curve that limits the grayscale values of the logo area of the second image frame to the second logo area threshold value or less; and
    a third image frame generator configured to generate a third image frame by decreasing at least some of the grayscale values of the logo area of the second image frame, based on the second mapping curve.

12. The logo controller of claim 11, wherein the logo area detector includes:
    a high grayscale area detector configured to detect a high grayscale area commonly included in the plurality of first image frames;
    a stop area detector configured to detect a stop area commonly included in the plurality of first image frames;
    an edge area detector configured to detect an edge area commonly included in the plurality of first image frames; and
    an overlapping area extractor configured to detect, as the logo area, an overlapping area of the high grayscale area, the stop area, and the edge area.

13. A logo controller comprising:
    a logo detector configured to detect a logo commonly included in a plurality of first image frames, based on the plurality of first image frames;
    a logo peripheral area setting unit configured to set a logo peripheral area expanded from the logo;
    a display load determiner configured to calculate a display load value, based on grayscale values of at least one first image frame, and determine a difference between a logo peripheral area representative value based on grayscale values of the logo peripheral area and the display load value exceeds a first reference value; and
    a logo peripheral area corrector configured to generate a second image frame by decreasing at least some of the grayscale values of the logo peripheral area, when the difference between the logo peripheral area representative value and the display load value exceeds the first reference value, and the difference between a logo representative value based on grayscale values of the logo and a first logo threshold value based on the grayscale values of the logo peripheral area is equal to or smaller than a second reference value.

14. The logo controller of claim 13, wherein the logo peripheral area setting unit includes:
    a logo area setting unit configured to set a logo area that surrounds an outer edge of the logo with a plurality of straight lines; and
    an area expander configured to set the outer edge of the logo peripheral area by expanding the outer edge of the logo area based on a predetermined spacing distance value,
    wherein an inner edge of the logo peripheral area corresponds to the outer edge of the logo.

15. The logo controller of claim 13, wherein the logo peripheral area corrector includes a logo peripheral area curve calculator configured to calculate first mapping curves that limit grayscale values of sub-areas of the log peripheral area respectively to sub-area threshold values or less, when the difference between the logo representative value and the first logo threshold value is equal to or smaller than the second reference value, wherein the first logo threshold value is larger than a minimum value of the sub-area threshold values and is smaller than a maximum value of the sub-area threshold values.

16. A logo control method comprising:

detecting a logo area commonly included in a plurality of first image frames, based on the plurality of first image frames;

setting a logo peripheral area expanded from the logo area;

calculating a display load value, based on grayscale values of at least one first image frame;

determining a difference between a logo peripheral area representative value based on grayscale values of the logo peripheral area and the display load value exceeding a first reference value; and generating a second image frame by decreasing at least some of the grayscale values of the logo peripheral area, when the difference between the logo peripheral area representative value and the display load value exceeds the first reference value, and the difference between a logo area representative value based on grayscale values of the logo area and a first logo area threshold value based on the grayscale values of the logo peripheral area is equal to or smaller than a second reference value.

17. The logo control method of claim 16, wherein the display load value corresponds to an average value of the grayscale values of the at least one first image frame, the logo peripheral area representative value corresponds to an average value of the grayscale values of the logo peripheral area of the first image frame, the logo area representative value corresponds to an average value of the grayscale values of the logo area of the first image frame, and the first logo area threshold value corresponds to a value obtained by adding a margin value to the average value of the grayscale values of the logo peripheral area of the first image frame.

18. The logo control method of claim 16, further comprising:

in response to the difference between the logo area representative value and the first logo area threshold value being equal to or smaller than the second reference value, calculating first mapping curves that limit grayscale values of sub-areas of the logo peripheral area respectively to sub-area threshold values or less; and generating the second image frame by decreasing at least some of the grayscale values of the sub-areas of the first image frame, based on the first mapping curves.

19. The logo control method of claim 18, further comprising setting a second logo area threshold value, based on grayscale values of the logo peripheral area of the second image frame, wherein the second logo area threshold value is smaller than or equal to the first logo area threshold value.

20. The logo control method of claim 19, further comprising:

calculating a second mapping curve that limits grayscale values of the logo area of the second image frame to the second logo area threshold value or less; and generating a third image frame by decreasing at least some of the grayscale values of the logo area of the second image frame, based on the second mapping curve.

* * * * *